(12) United States Patent
Ishikawa et al.

(10) Patent No.: US 6,413,183 B1
(45) Date of Patent: Jul. 2, 2002

(54) POWER TRANSMISSION APPARATUS

(75) Inventors: Yasuhiko Ishikawa; Kazutaka Kawata; Hiroshi Nohara; Toshio Shiba; Naoshi Mogami; Katsumi Tanaka; Norihiko Tashiro; Naoyuki Shioda; Tadashi Oikawa; Akihiro Mashiyama; Osamu Ishikawa; Masayuki Sayama; Shigeyuki Shimada; Hideyuki Inose; Yoshiharu Shouda, all of Tochigi (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 09/546,895

(22) Filed: Apr. 10, 2000

(30) Foreign Application Priority Data

Apr. 14, 1999 (JP) ............................................. 11-107160
Apr. 14, 1999 (JP) ............................................. 11-107165

(51) Int. Cl.[7] .......................... F16H 57/04; F16H 48/06
(52) U.S. Cl. ...................................... 475/160; 475/231
(58) Field of Search .......................... 475/88, 90, 160, 475/231; 184/6.12, 11.1, 13.1

(56) References Cited

U.S. PATENT DOCUMENTS

| 2,971,404 A | * | 2/1961 | Thornton ...................... 475/88 |
| 3,049,943 A | | 8/1962 | Frentzel |
| 3,145,583 A | | 8/1964 | Frentzel |
| 3,365,983 A | | 1/1968 | Jeakle |
| 3,429,400 A | * | 2/1969 | Engle et al. ............ 475/160 X |
| 3,741,343 A | * | 6/1973 | Lindenfeld .............. 162/113 B |
| 3,742,784 A | * | 7/1973 | Engle ......................... 74/710.5 |
| 4,169,394 A | * | 10/1979 | Estrada ........................ 74/713 |
| 5,007,885 A | * | 4/1991 | Yamamoto et al. ......... 475/231 |
| 5,294,350 A | * | 3/1994 | Murphy et al. ............. 210/168 |
| 5,643,127 A | * | 7/1997 | Yoshii et al. ............... 475/160 |
| 6,066,063 A | * | 5/2000 | Ishikawa ................ 475/231 X |

FOREIGN PATENT DOCUMENTS

| DE | 2033832 | | 1/1971 |
| DE | 2219258 C3 | | 3/1984 |
| DE | 3208100 C2 | | 9/1984 |
| DE | 3426460 C1 | | 5/1985 |
| DE | 3901654 A1 | | 8/1989 |
| DE | 3713819 C2 | | 11/1992 |
| DE | 19650039 A1 | | 6/1997 |
| DE | 19730714 A1 | | 1/1998 |
| EP | 0711935 A1 | | 11/1995 |
| EP | 0864779 A1 | | 2/1998 |
| JP | 46-8206 | | 3/1971 |
| JP | 5-25038 | | 4/1993 |
| JP | 405209656 | * | 8/1993 |

* cited by examiner

Primary Examiner—Charles A Marmor
Assistant Examiner—Roger Pang
(74) Attorney, Agent, or Firm—Morrison & Foerster LLP

(57) ABSTRACT

An outer rotational member has an inner wall surface and an outer wall surface. An inner rotational member is arranged inside the outer rotational member. Friction-clutch means is provided between the inner rotational member and the outer rotational member and is fastened by a thrust force. An oil lubricates at least the friction-clutch means. An oil space intervenes between the inner rotational member and the outer rotational member. Seal means seals the oil in the oil space. A first oil reservoir is recessed on the inner wall surface of the outer rotational member toward a side of the outer wall surface side.

20 Claims, 17 Drawing Sheets

POWER TRANSMISSION APPARATUS

BACKGROUND OF THE INVENTION

1. Field of the Invention

The present invention relates to a power transmission apparatus employed for an automobile, and more particularly to a power transmission apparatus used in a torque transmitting passage, for example, in a middle of a shaft connecting right and left road wheels and in a middle of a shaft between a front road wheel and a rear road wheel.

2. Description of Relevant Art

In recent years, in a front engine front drive vehicle (FF vehicle), a differential gear having a torque sensitive type limited slip differential function has been reconsidered. When the vehicle is provided with this equipment, a lot of advantageous features can be obtained, for example, a motion performance,of a vehicle is improved, that is, a handling performance is improved, a response against a stepping down operation of an accelerator pedal is improved, a stability of a vehicle motion is improved and the like, so that a mounting rate is increased.

Japanese Patent Publication No. 46-8206 is related to a bevel gear type differential gear.

A differential gear is rotatably supported to a differential carrier (not shown) in boss portions at both ends of a differential case. An inner portion of the differential case is lubricated by an oil in an oil reservoir provided in the differential carrier.

A differential gear mechanism is constituted by a pinion shaft fixed to the differential case, a pinion gear rotatably supported on the pinion shaft and a pair of oppositely arranged side gears meshing with the pinion gear, and the side gears are movably connected to axles, respectively.

Further, clutch members in a pressing side are movably connected onto the axles adjacent to a back surface of each of the side gears and a clutch member in a pressure receiving side is fixed to an inner wall of the differential case. A corn clutch is constituted by both clutch members, thereby performing a limited slip differential operation.

A large opening for assembling the differential gear mechanism and the corn clutches is provided in a cylindrical wall portion of the differential case, and the opening also constitutes a port for a lubricating oil.

However, in general, a housing for accommodating the differential gear is commonly used with a housing for a transmission, and in this case, a lubricating oil of the differential gear is commonly used with that of the transmission. Among the lubricating oil, an AT oil employed for an automatic transmission has a viscosity lower than that of an MT oil employed for a manual transmission, and commonly serves as a working fluid for a hydraulic torque converter. This structure is provided for reducing a frictional loss of the oil flow passage. Further, the viscosity of the AT oil is reduced in the case of being employed for operating the hydraulic actuator. This structure is provided for normally operating the actuator even under a condition that the oil temperature is low.

Further, the AT oil contains an extreme pressure agent. This is provided for improving an abrasion resistance of a drive transmitting surface having a high surface pressure, for example, between a pulley and a belt of a continuously variable transmission (CVT).

Since the differential gear is arranged in a portion after a final reduction of an engine speed under a condition of being dip-feed lubricated by the lubricating oil, a torque corresponding to some times a drive torque transmitted from the engine to the transmission is transmitted. Accordingly, a great force is applied to the slide friction surface and a lubricating oil film can not be kept.

Japanese Utility Model Application Laid-Open (JU-A) No. 5-25038 relates to a sealed type coupling.

A coupling is arranged between a front road wheel and a rear road wheel of a four wheel drive vehicle and distributes a drive force to the front and rear road wheels in correspondence to a difference of a rotational speed generated between the front and rear road wheels. A vane pump is arranged between an input shaft and an output shaft. That is, a rotor of the vane pump is spline connected to the input shaft in the front road wheel side and integrally rotates. On the contrary, a casing is connected to the output shaft in the rear road wheel side and a cam ring is fixed to the casing and integrally rotates with the output shaft.

When the difference of the rotational speed is generated between the front and rear road wheels, the vane pump performs a pump operation together with a relative rotation between the rotor and the cam ring. Accordingly, a hydraulic pressure is generated in correspondence to the difference of the rotational speed between both of the shafts and operates so as to restrict the relative rotation between both of the shafts (between the front and rear road wheels).

At a time of operating the vane pump, the oil in the oil tank provided in the periphery of the casing circulates between the inner portion of the oil tank and the vane pump. The circulating oil is cooled by air within the tank, whereby an abrasion and a seizure of the vane pump are prevented.

SUMMARY OF THE INVENTION

However, when an amount of the lubricating oil is not sufficient, the lubricating oil does not sufficiently spread around an engagement portion of the gear, a friction of the engagement portion is increased and a durability of the parts is reduced. Further, a temperature of the lubricating oil is increased, and the lubricating oil is deteriorated. Further, when the viscosity of the lubricating oil is reduced and the great force is applied, the slide lubricating oil film is not kept. Further, an abraded powder generated from the engagement portion of the gear or the like prevents the lubricating oil from flowing, and particularly, reduces a durability of the engagement portion.

A first object of the present invention is to provide a power transmission apparatus in which a lubricating oil suitable for an element constituting an apparatus is used.

A second object of the present invention is to provide a power transmission apparatus which improves a durability of an element constituting an apparatus.

A third object of the present invention is to provide a power transmission apparatus which secures a cooling performance of a lubricating oil.

A fourth object of the present invention is to provide a power transmission apparatus which secures a flowability of a lubricating oil.

A fifth object of the present invention is to provided a power transmission apparatus which improves a durability of an element constituting an apparatus without increasing a size and a weight of the apparatus.

In order to achieve the objects mentioned above, in accordance with the present invention, there is provided a power transmission apparatus employed for a drive train of a vehicle, in which the following features are provided. That is, an outer rotational member has an inner wall surface and an outer wall surface. An inner rotational member is arranged inside the outer rotational member. Friction-clutch means is provided between the inner rotational member and the outer rotational member and is fastened by a thrust force. An oil lubricates at least the friction-clutch means. An oil space intervenes between the inner rotational member and the outer rotational member. Seal means seals the oil in the oil space. A first oil reservoir is recessed on the inner wall surface of the outer rotational member toward a side of the outer wall surface side.

In this case, "the power transmission apparatus" includes, for example, a differential gear mounted in a middle of a shaft connecting drive road wheels and a coupling mounted in a middle of a shaft between a front road wheel and a rear road wheel. Further, a cone clutch type, a structure having a multi disc clutch or a parallel shaft type limited slip differential system is desirable for the differential gear.

"The outer and inner rotational member" includes a member directly or indirectly rotated by the torque. The outer rotational member is, for example, a housing. The inner rotational member includes, for example, a gear connected to the drive shaft, a hub connected to the propeller shaft, and an intermediate member connecting the drive shaft to the gear, for example, an intermediate shaft.

"The oil" has a different property from AT oil, such as a basic property of an oil, an additive compounded with an oil, and a compounded quantity of an additive component. The oil preferably has a high viscosity property adapted for a friction-clutch.

"Fastening" includes a state of fixing the first rotational member and the second rotational member and a state of relatively rotating both the elements.

In accordance with the present invention, the inner portion of the apparatus is separated from the outer portion of the apparatus, and it is possible to use the oil suitable for the inner portion of the apparatus. Further, the differential gear in which the oil: is previously sealed can be transferred as it is and there is no draw back that the oil left within the apparatus leaks out at a time of mounting, so that an assembling operation can be easily performed and a cost thereof can be reduced.

On the contrary, an amount of the oil is increased, and the oil is sufficiently spread around each of the rotational members and a lubricating performance and a flowability can be improved. Further, since a contact area between the oil and the other members is increased, a cooling performance of the oil can be improved.

Preferably, the first oil reservoir has an opening passing through the outer rotational member and a closing member for closing the opening.

In accordance with this structure, the opening can be easily formed and easily closed by the closing member, whereby a first oil reservoir can be secured.

Preferably, the closing member closes only the opening.

In accordance with this structure, the first oil reservoir can be set to a predetermined capacity. Further, an interference with a circumferential member can be prevented.

Preferably, the closing member is an annular member covering the outer wall surface of the outer rotational member.

In accordance with this structure, the number of the parts can be reduced and it is easy to assemble the members. A heat radiating performance of the closing member can be improved and the oil can be more easily cooled. A sealing performance can be improved.

Preferably, the annular member is contacted tight with the outer wall surface of the outer rotational member.

In accordance with this structure, a pressure of the oil to which a centrifugal operation is applied is reduced by a contacting portion and a sealing performance can be improved.

Preferably, the annular member is apart from the outer wall surface of the outer rotational member to define a space portion, and this space portion forms a second oil reservoir.

In accordance with this structure, the sealed oil is increased and a surface area of the annular member is increased, so that a heat radiating performance can be further improved.

Preferably, the power transmission apparatus is further provided with a member to be moved for changing an internal volume of the space portion between the annular member and the outer wall surface of the outer rotational member.

In accordance with this structure, a pressure increase of the oil space can be regulated, and the constituting member within the apparatus, for example, mainly having a friction-clutch is prevented from being abraded due to a heat generation. Further, a heat generation can be restricted and an oil deterioration can be prevented.

Preferably, the power transmission apparatus is provided with a magnetic member fixed to the closing member.

"The magnetic member" includes a permanent magnet and an electromagnet.

In accordance with this structure, the abraded powders are collected to the magnetic member, so that no bad influence such as a clogging or the like is applied to the sliding portion of the constituting member within the power transmission member mainly having the friction-clutch means. Further, a deterioration of the oil can be restricted.

Preferably, the power transmission apparatus is further provided with an annular seal means interposed between the annular member and the outer wall surface of the outer rotational member.

In accordance with this structure, an assembling performance can be improved and a uniform sealing performance can be obtained all around the periphery.

Preferably, the outer rotational member has a side wall in a direction crossing the rotational shaft, and the first oil reservoir is defined by an inner wall surface of the side wall in an annular shape.

In accordance with this structure, in a radial direction of the outer rotational member, in addition that it is possible to avoid increasing a size, it is possible to secure an amount of oil.

Preferably, the outer rotational member has a side wall in a direction crossing the rotational shaft, and the first oil reservoir has an opening defined by the side wall and an annular second oil reservoir communicating with the opening and arranged adjacent to the side wall.

In accordance with this structure, an amount of sealed oil can be increased. A surface area of the closing member can be increased and a heat radiating performance can be improved.

Preferably, the outer rotational member has a thick portion being thicker than the other portions, and the first oil reservoir is formed within the thick portion.

In accordance with this structure, it is possible to prevent the thick portion from being filled with the heat as well as it is possible to intend to reduce a weight of the apparatus.

Preferably, the thick portion has a protruding portion protruding outside the outer rotational member, and the first oil reservoir is formed within the protruding portion.

In accordance with this structure, an amount of sealed oil can be increased. A surface area of the closing member can be increased and a heat radiating performance can be improved.

Preferably, a plurality of power transmission gears supported along a circumferential direction is provided in the outer rotational member side. The first oil reservoir is formed in the thick portion between the plurality of gears along the circumferential direction.

In accordance with this structure, no new member is required and it is possible to intend to reduce a weight of the apparatus. It is possible to prevent the thick portion from being filled with the heat. It is possible to reduce a rigid body vibration generated by the constituting member such as the gear or the like, and a durability can be improved.

Preferably, the closing member positions the power transmission member arranged in the outer rotational member.

"The power transmission member" is, for example, a pinion shaft.

In accordance with this structure, since it is not necessary to independently provide a positioning member, the number of the parts can be reduced.

Preferably, the power transmission apparatus is further provided with an electromagnetic clutch, a pilot clutch to be fastened by the electromagnetic clutch, and a cam mechanism for converting a fastening torque of the pilot clutch into a thrust force. The friction-clutch means is a main clutch to be fastened by the thrust force of the cam mechanism. The inner rotational member is a hub arranged in an inner side of the main clutch. The outer rotational member is a case for accommodating the main clutch.

In accordance with this structure, in the power transmission apparatus having a lot of members constituting the friction, it is possible to obtain secure and sufficient lubricating and cooling performance.

Preferably, the power transmission apparatus is further provided with a pinion shaft, and a pinion gear supported to rotate around the pinion shaft. The inner rotational member is a side gear meshing with the pinion gear so as to generate a differential motion. The outer rotational member is a case for accommodating the side gear. The friction-clutch means is a corn clutch to slide between the side gear and the case so as to limit the differential motion.

In accordance with this structure, it is possible to provide a light and compact power transmission apparatus, and a significantly improved mounting performance can be obtained by combining with an automatic transmission (AT).

Preferably, the inner rotational member is a side gear meshing with a pinion gear so as to generate a differential motion. The outer rotational member is a case having an inner hole and supporting the pinion gear to be rotated in the inner hole. The friction- clutch means is to slide between the pinion gear and the case to limit the differential motion.

In accordance with this structure, it is possible to obtain a sealed space sufficiently utilizing a limited space for the apparatus and the apparatus can be established at a high possibility.

Preferably, the power transmission apparatus is provided with a pinion shaft, and a pinion gear supported to rotate around the pinion shaft. The inner rotational member is a side gear meshing with the pinion gear to generate a differential motion. The outer rotational member is a case for accommodating the side gear. The friction-clutch means is a multiple disc clutch provided between the side gear and the case for limiting the differential motion.

In accordance with this structure, in the power transmission apparatus having a lot of members constituting the friction, it is possible to obtain secure and sufficient lubricating and cooling performance.

Preferably, the first oil reservoir is provided in an outer side relative to the friction-clutch means in a radial direction.

In accordance with this structure, an influence applied to the friction-clutch portion by the abraded power can be restricted. This makes it easy to supply the oil to the friction-clutch portion.

Preferably, the first oil reservoir is provided in an outer side relative to the friction-clutch means in a direction of the rotational axis of the outer rotational member and in an inner side of the friction-clutch means in a radial direction of the outer rotational member.

In accordance with this structure, an influence applied to the friction-clutch portion by the abraded power can be restricted. It makes it easy to supply the oil to the friction-clutch.

Preferably, the first oil reservoir is a space formed in an inner portion of the side gear.

In accordance with this structure, an amount of oil can be increased and it is possible to prevent the inner portion of the side gear from being filled with heat.

Preferably, the power transmission apparatus is provided with an accumulator connected to the closing member.

Preferably, the seal means seals an end opening of the inner rotational member in a rotational axis direction.

BRIEF DESCRIPTION OF THE ACCOMPANYING DRAWING

DETAILED DESCRIPTION OF THE PREFERRED EMBODIMENTS

Descriptions will be given below of embodiments in accordance with the present invention with reference to the accompanying drawings.

First Embodiment

Figure 1:
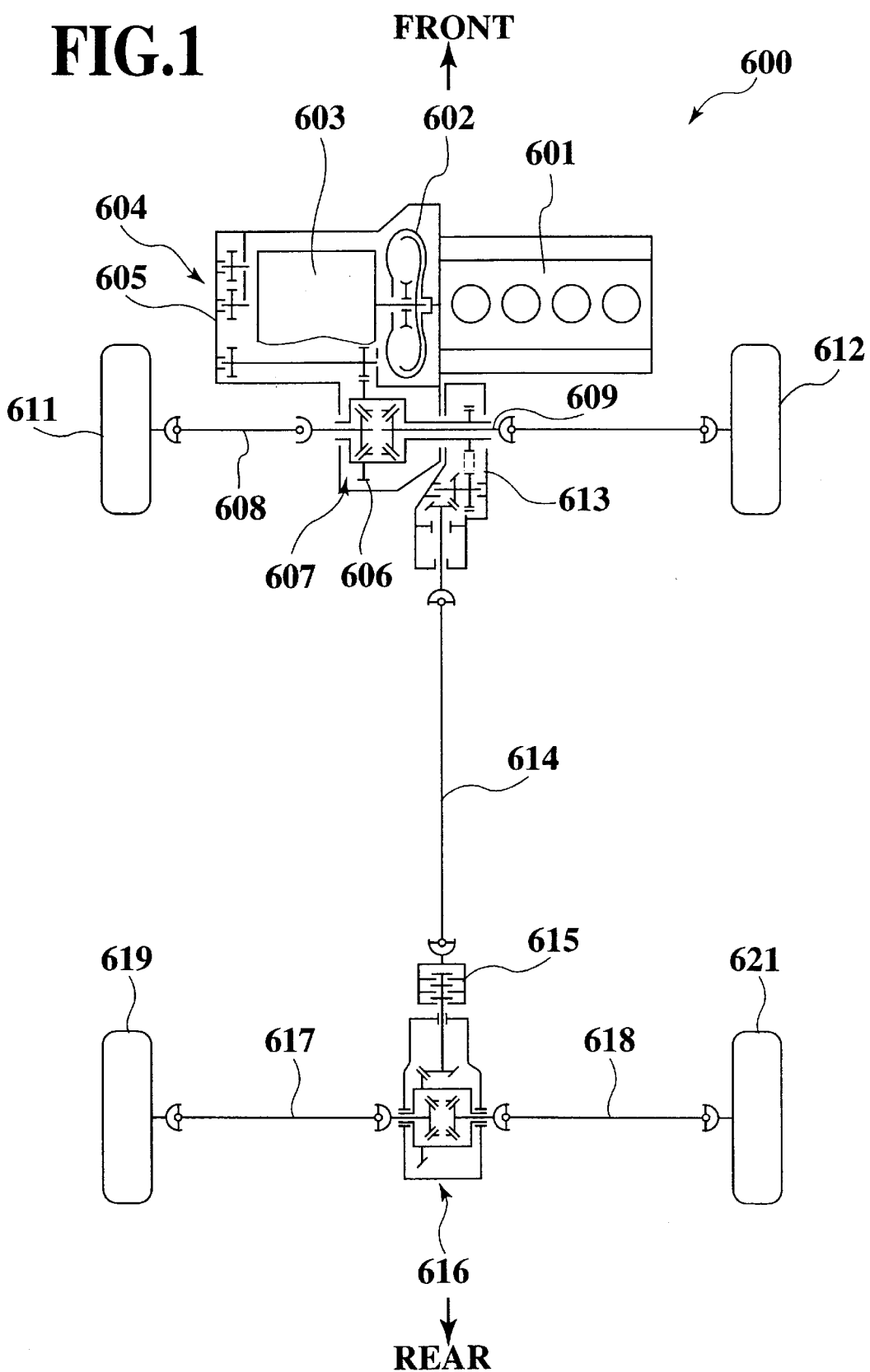
FIG. 1 is a schematic view showing a drive circuit of an automobile to which an embodiment in accordance with the present invention is applied.

FIG. 1 shows a drive train 600 of a four wheel drive system for an automobile.

A drive torque generated in an engine 601 passes through a torque converter 602, an automatic transmission 603, a transmission gear set 604 and a final gear, and thus being input to a differential gear 607 corresponding to a power transmission apparatus of the present invention through a drive gear 606. A torque from the differential gear 607 passes through left and right front drive shafts 608 and 609, and is input to left and right front road wheels 611 and 612 to be rotated. On the contrary, a part of the torque is input to a transfer box 613 and a direction of transmitting the torque is converted at 90 degrees. Converted torque passes though a propeller shaft 614, and is input to a coupling 615 corresponding to a power transmission apparatus in accordance with the present invention. A torque is adjusted to a predetermined magnitude. Adjusted torque passes though a differential gear 616 in accordance with the present invention and left and right rear drive shafts 617, thus adjusting a rotation of left and right rear road wheels 619 and 621.

Figure 2:
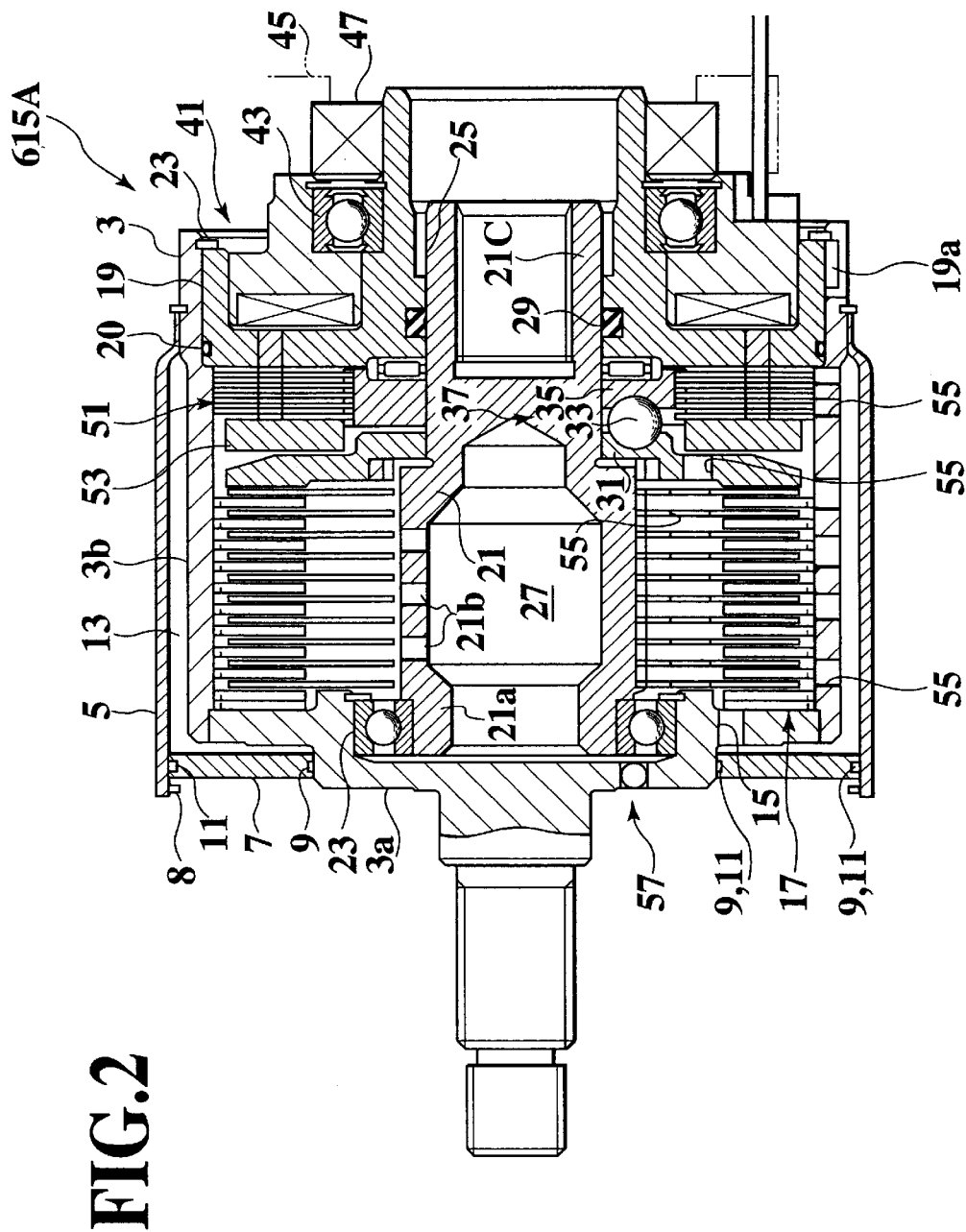
FIG. 2 is a cross-sectional view of a coupling in accordance with a first embodiment.

FIG. 2 shows a coupling in accordance with a first embodiment.

A sealed type coupling 615A is arranged between a rear differential gear set in a disengaging side and an engine (in a transfer side) in a four wheel drive system shown in FIG. 1.

In an outer housing 3 corresponding to an outer rotational member of the coupling 615A, an input portion 3a constituted by a shaft portion and a side wall portion and a hollow cylinder portion 3b are joined to integrate with each other. The input portion 3a is rotatably supported to a vehicle body side member, that is, a propeller shaft 614 through a bearing (not shown). A drive torque transmitted from the engine is input to the input portion 3a of the housing 3. A space between the housing 3 and the hub 21 forms a flow passage for a lubricating oil.

A thin cover 5 corresponding to a closing member or an annular plate is mounted to a periphery of the cylinder portion 3b of the housing 3 at a predetermined gap in a closely attached state. A ring-like free piston 7 corresponding to a movable adjusting member is arranged between a left end portion of the cover 5 and the input portion 3a of the housing 3 so as to freely move in an axial direction. Inner and outer peripheries of the free piston 7 is sealed by D-rings 9 and 11 corresponding to seal means. A ring-like tank 13 corresponding to a second oil reservoir is formed between the cover 5 and the housing 3 and communicates with a below-mentioned main clutch 17 through an oil passage 15 of the input portion 3a of the housing 3.

The free piston 7 moves in an axial direction in correspondence to a change of an internal pressure of the tank 13, and an internal volume thereof can be changed. Thus the tank 13 operates as an accumulator. Further, a snap ring 8 is fixed to an end portion of the cover 5 and restricts movement of the free piston 7 in an axial direction.

On the contrary, an inner housing 19 corresponding to an inner rotational member is fitted to a right end portion of the housing 3. The housing 19 is sealed by an O-ring 20 corresponding to seal means and is prevented from being taken out by a stop ring 23. Then, it integrally rotates with the housing 3 due to engagement of a convex portion 19a.

The hollow hub 21 corresponding to the inner rotational member is rotatably supported to a side of an axis of the housing 3 through bearings 23 and 25. An axial side oil reservoir 27 with a bottom is provided in an axial portion of a large diameter shaft portion 21a of the hub 21. An oil passage 21b corresponding to an oil reservoir is provided on a peripheral wall of the axial side oil reservoir 27. A portion between a small diameter shaft portion 21c of the hub 21 and the inner housing 19 is sealed by an X-shaped seal ring 29 corresponding to the seal means. Then, a driven shaft (not shown) is connected to an inner periphery of the hub 21, and a drive torque is transmitted to the rear road wheel through the driven shaft from the hub 21.

A multiple disc main clutch 17 corresponding to friction-clutch means is arranged between the cylinder portion 3b of the outer housing 3 and the large diameter shaft portion 21a of the hub 21. A pressing member 31 is arranged on the small diameter shaft portion 21c of the hub 21 and rightward adjacent to the main clutch 17, and the pressing member 31 is engaged with the hub 21. A cam member 35 is arranged in a right portion of the pressing member 31 though a ball 33. A cam groove engaged with the ball 33 is provided on an opposing surface of the pressing member 31 and the cam member 35, so that a cam mechanism 37 is constituted by these members.

On the contrary, an electromagnet 41 is supported to a recess portion of the inner housing 19 formed in a substantially C-shape through a bearing 43. A yoke portion 41a of the electromagnet 41 is fixed to the vehicle body side member 45 and does not rotate. In this case, a portion between the vehicle body side member 45 and the inner housing 19 is sealed by a seal 47 corresponding to a seal portion. An opposing portion 47 of the inner housing 17 to the electromagnet 41 is constituted by a nonmagnetic body.

An electromagnetic pilot clutch 51 corresponding to friction-clutch means is arranged between the inner housing 19 and the cam member 35. An armature 53 is arranged adjacent to a left portion thereof so as to be engaged with the cylinder portion 3b of the housing 3.

In this case, an oil passage 55 corresponding to a first oil reservoir for the lubricating oil is provided in each of the pressing member 31, the main clutch 17 and the cylinder portion 3b of the housing 3, in addition to the oil passage 21b provided in the large diameter portion 21a of the hub 21 mentioned above. The lubricating oil is charged from a charging port 57 into a coupling 615A at a predetermined amount, and the charging port 57 is sealed by caulking after charging.

Next, a description will be given of an operation of the coupling 615A.

When the electromagnet 41 is energized, the armature 53 is sucked and the pilot clutch 51 is fastened. The fastening torque is converted and enlarged to a thrust force by the cam mechanism 37. The thrust force is applied to the pressing member. The pressing member 31 presses the main clutch 17, so that the main clutch 17 is fastened. The multiple disc main clutches 55 relatively rotate while sliding with each other. Accordingly, a great torque is transmitted from the hub 21 to the rear wheel side.

In this case, by adjusting a fastening force (a magnetic force) of the pilot clutch 51, it is possible to adjust a fastening force of the main clutch 17 (a connection force of the connecting apparatus 1).

When the coupling 1 is operated, a lubricating oil in the axial side oil reservoir 27 of the hub 21 passes through an oil passage 21b due to a centrifugal force and lubricates and cools the main clutch 17. In addition, the lubricating oil passes through an oil passage 55 of the pressing member 31, and lubricates and cools the cam mechanism 37, the pilot clutch 51 and the like. The lubricating oil after passing through each of the clutches 17 and 51 passes through the oil passage 55 of the cylinder portion 3b in the housing 3 and enters into the tank 13. A change of the internal pressure of the tank 13 is reduced by a movement of the free piston 7. Then, the lubricating oil is cooled during a period of being disposed within the tank 13.

As mentioned above, in accordance with the present embodiment, it is possible to arrange the tank 13 having a large volume in the outer peripheral portion of the coupling 615A even when the operating condition is comparatively severe. Thus, it is possible improve a cooling performance due to a cooling operation of the lubricating oil within the tank 13 together with an increase of an amount of the lubricating oil, so that it is possible to reduce a draw back of seizure of the sliding portion.

Further, since it is possible to reduce an increase of an internal pressure of the tank 13 by the free piston 7, it is possible to improve a durability of the seal.

Further, a metal abraded power and the like contained in the lubricating oil are easily collected to the tank 13 through the oil passage 55, and it is advantageous for purifying the lubricating oil.

In this case, in some use conditions of the coupling 615A, it is possible to obtain a tank structure in which the free piston 7 is omitted.

Second Embodiment

Figure 3:
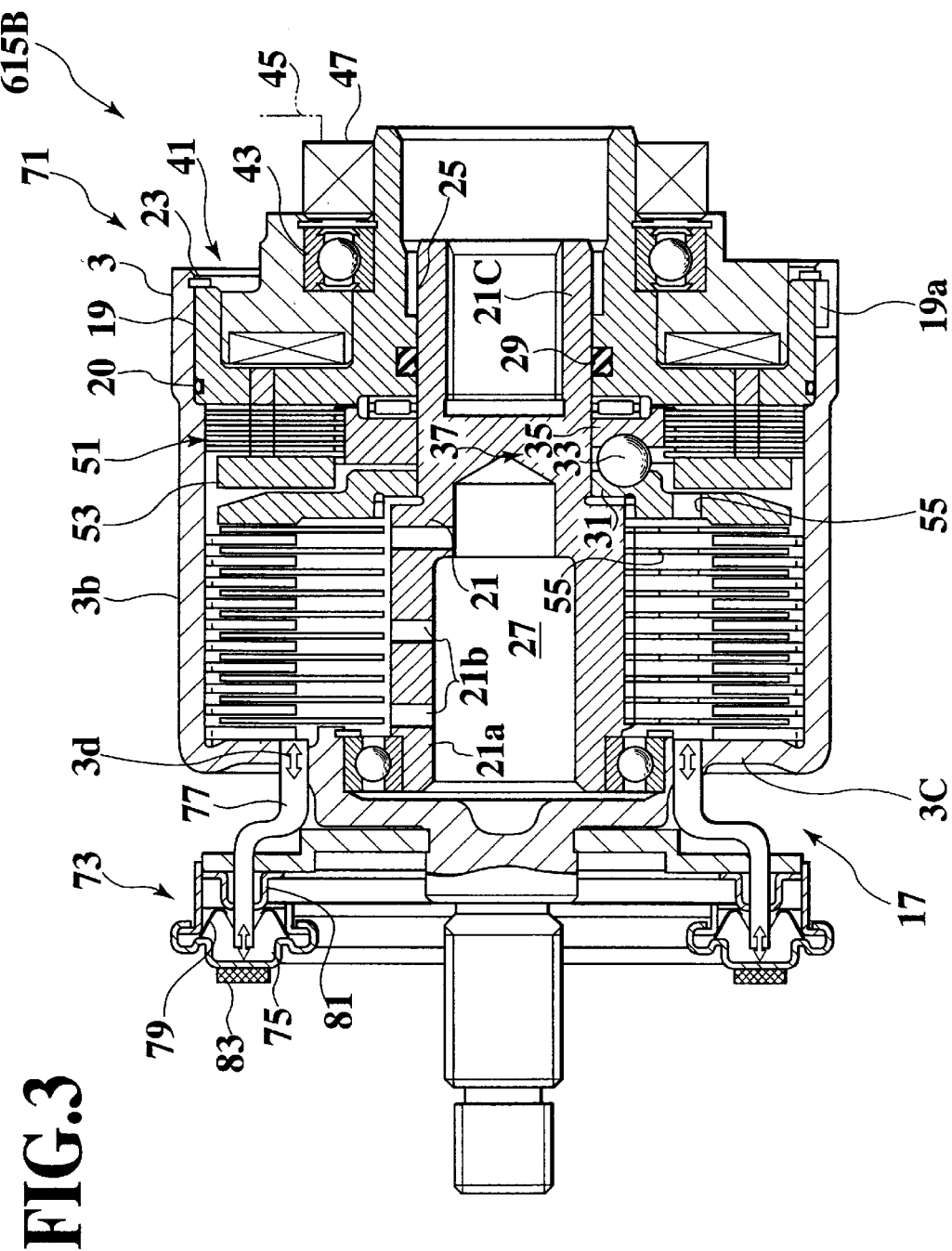
FIG. 3 is a cross-sectional view of a coupling in accordance with a second embodiment.

A description will be given of a second embodiment in accordance with the present invention with reference to FIG. 3. In a coupling 615B, since a structure of the accumulator is different from the first embodiment mentioned above and the other structures are the same (have the same reference numerals as those shown in FIG. 3), different points are described and an overlapping description will be omitted.

The housing 3 has a side wall 3c. An opening 3d corresponding to a first oil reservoir is formed on the side wall 3c.

An accumulator 73 corresponding to a closing member is mounted to an input portion 3a of the outer housing 3 corresponding to an outer rotational member of the coupling 71. A diaphragm chamber 75 of the accumulator 73 corresponding to a second oil reservoir communicates with the main clutch 17 through an oil passage 77. The oil passage 77 is pressed to insert in the opening 3d of the side wall 3c, thus being fixed due to bonding. Then, an elastic member 81 and an atmospheric pressure biases a diaphragm 79 at a predetermined biasing force, and an internal volume of the diaphragm chamber 75 corresponding to the second oil reservoir is made variable.

Further, a magnet 83 corresponding to a magnetic member is mounted to an outer side wall surface of the accumulator 73.

In accordance with the present embodiment, the opening 3d, the oil passage 77 and the diaphragm chamber 75 increase a storage amount of the lubricating oil.

Further, the volume of the diaphragm chamber 75 of the accumulator 73 changes in correspondence to the pressure of the main clutch 17, and it is possible to reduce an increase of the pressure, so that it is possible to improve a durability of each of the seal rings 20 and 29 and the seal 47.

Further, the lubricating oil,is structured such that a cooling performance can be improved by being cooled within the accumulator 73 and can reduce a draw back that the sliding portion is seized.

Further, the metal abraded powder and the like contained in the lubricating oil are attracted to be fixed to to the magnet 83 within the accumulator 73 and a durability of the coupling 615B can be improved.

Third Embodiment

Figure 4:
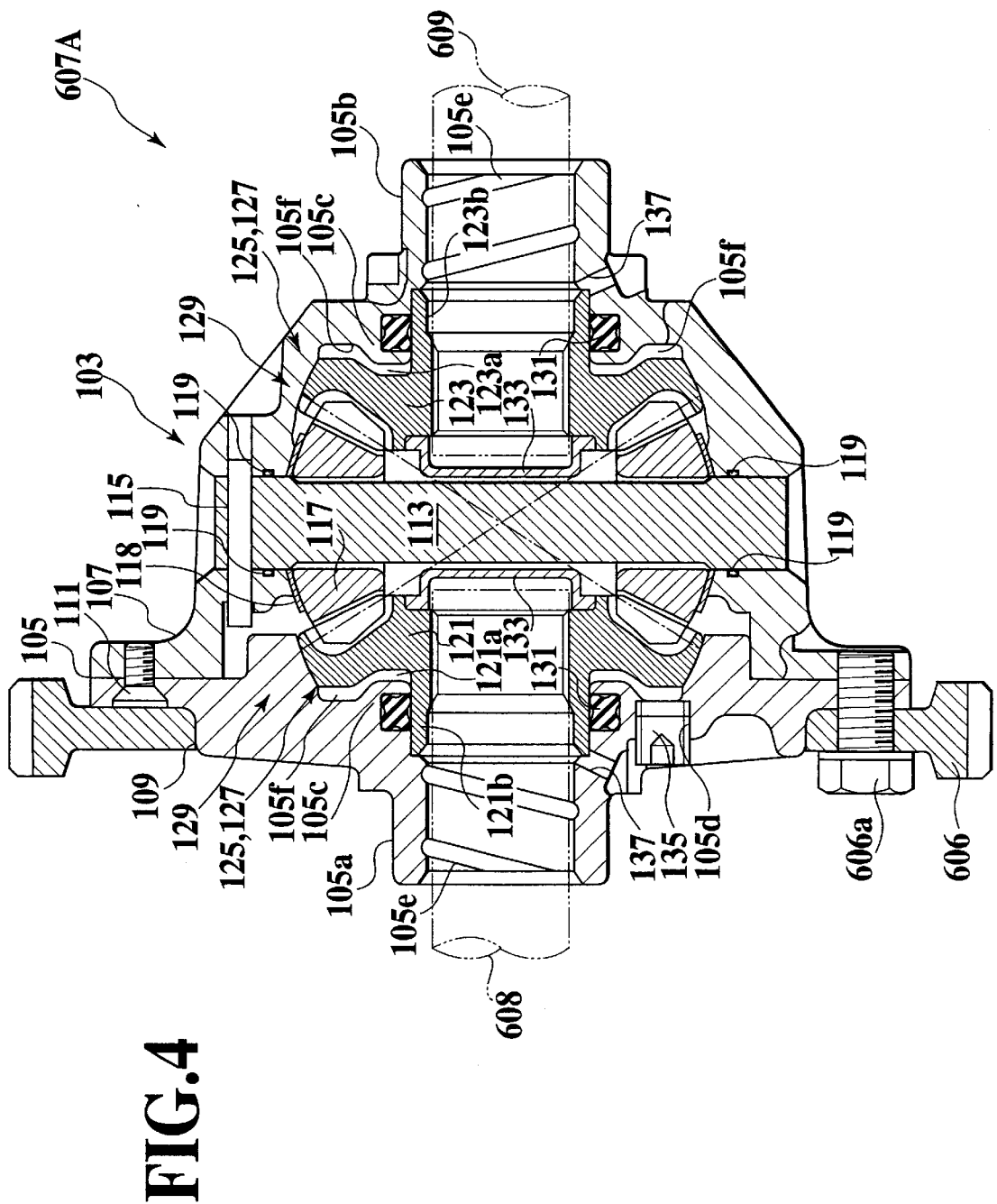
FIG. 4 is a cross-sectional view of a differential gear in accordance with a third embodiment.

As shown in FIG. 4, a differential gear 607A applied to a drive train is provided with a bevel gear type differential mechanism 103. In a differential case 105 corresponding to an outer rotational member, bolts or screws 111 connect a case main body 107 and a cover 109 with each other. The bolts 111 work as a take-out prevention and a rotation prevention in a state that a drive gear 606 is fixed. The differential case 105 is rotatably supported to a carrier case through a bearing (not shown) in hollow shaft portions 105a and 105b disposed in left and right ends. Further, a drive gear 606 is fixed to the differential case 105 by a fixing bolt 606a and a drive torque of the engine is input to the differential case 105 through the drive gear 606.

A cylindrical pinion shaft 113 is pressed to insert to the differential case 105 at right angles to a rotational axis, and is prevented from being taken out by the pin 115. O-rings 119 corresponding to the seal means are provided between a side surface of the pinion shaft 113 and the case main body 107 to be sealed. An annular pinion gear 117 is rotatably supported on the pinion shaft 113 and is meshing with left and right output side gears 121 and 123 corresponding to the inner rotational members oppositely arranged in an axial direction. In the manner mentioned above, the differential gear mechanism 103 is structured. Front end portions of the left and right drive shafts 608, 609 are respectively spline connected to the inner peripheries of the respective side gears 121 and 123. The drive force is distributed to each of the output shafts through the differential gear mechanism 103. In this case, a spherical washer 118 is provided on a back surface of the pinion gear 117, thereby reducing a sliding frictional resistance.

A conical surface 125 having a diameter reduced toward an outer portion in an axial direction is formed on outer peripheries of the side gears 121 and 123. A conical surface 127 is also formed on the inner wall surface portion of the corresponding differential case 105. When the side gears 121 and 123 moves to the outer position in the axial direction due to an application of the thrust force generated by the engagement with the pinion gear 117, the conical surfaces 125 and 127 can be brought into contact with each other. In the manner mentioned above, a corn clutch 129 corresponding to a limited slip differential mechanism and friction-clutch means is structured.

Recessed portions 121a and 123a are formed on the back surface of the side gears 121 and. 123, to which convex portions 105c and 105c of the differential case 105 are inserted. X-rings 131 and 131 corresponding to the seal means are arranged between the convex portion 105c and hollow shaft portions 121b and 123b of the side gears 121 and 123.

Further, an annular recessed portion 105f corresponding to a first oil reservoir is defined in an outer side of the side gears 121 and 123 in a direction of a rotational axis, in an outer peripheral side of the X-ring 131 and in an inner peripheral side of the corn clutch 129 in a radial direction. The recessed portion 105f is formed by depressing the side wall inner surface of the cover 109. Accordingly, it is possible to smoothly supply the lubricating oil to the friction-clutch portion.

Further, a convex or cup-shaped plate 133 corresponding to the seal means is pressed to insert and joined to an end portion of each of the side gears 121 and 123 facing to the oil space. The plate 133 prevents front ends of drive shafts 608 and 609 connected to the side gears 121 and 123 from being brought into contact with the side gears 121 and 123 so as to generate an interference. The side gears 121 and 123 and the plate 133 may be integrally formed with each other, for example, by a forging producing method. Further, the plate 133 prevents the oil from leaking out to the outer portion of the differential case 105 through the inner portions of the hollow shaft portions 121b and 123b of the side gears 121 and 123. The inner portion of the differential case 105, is sealed by the O-ring 119, the X-ring and the plate 133.

Then, an oil supply hole 105d for the lubricating oil corresponding to the opening communicating with the recessed portion 105f is provided in the side wall of the differential case 105, and a predetermined amount of lubricating oil is charged from the oil supply hole 105d. After charging, the oil supply hole 105d is sealed by a taper plug 135 corresponding to a closing member so as to form an oil reservoir.

In this case, a spiral oil groove 105e is formed on each inner periphery of the hollow,shaft portions 105a and 105b of the differential case 105. A radially extending oil passage 137 is formed near an inner end of the oil groove 105e. A connecting portion between the side gears 121 and 123 and the output shaft, and the inner peripheral portions of the hollow shaft portions 105a and 105b of the differential case 105 constitute an outer portion of the differential case 105. They are lubricated by a different lubricating oil from that for the inner portion of the differential case 105 as well as a bearing supporting the differential case 105 and a drive gear 606 for the input portion.

A description will be given of an operation of the differential gear 607A.

In general, a torque generated in the engine 601 is transmitted through the drive gear 606, the differential case 105 and the pinion shaft 113. Next, the torque is uniformly distributed to the left and right drive shafts 608 and 609 through the pinion gear 117 and the side gear 113. Accordingly, the left and right front road wheels 612 and 613 are equally rotated, respectively.

Next, the left front road wheel 611 moves forward more than the right front road wheel 612 when the automobile turns right, and the left front road wheel 611 receives a greater resistance from the road surface than the right front road wheel 612. An engagement force between the pinion gear 117 and the side gear 121 becomes greater than an engagement force between the pinion gear 117 and the side gear 123, and the pinion gear 117 rotates around the pinion shaft. The side gears 121 and 123 are rotated in an opposite direction to each other, the number of rotation of the right front road wheel 612 is reduced more than that of the drive gear 606, and the number of rotation of the left front road wheel 611 is increased more than that of the drive gear 606. Accordingly, a right turn is smoothly performed.

On the contrary, when the left road wheel 611 is caught by a bad road, the left road wheel 611 becomes in a low speed rotating state and the right road wheel 612 becomes in a high speed rotating state. The corn clutch 129 slides and the friction torque is generated. The friction torque reduces the torque transmitted to the right side gear 123 and increases the torque transmitted to the left side gear 121. Accordingly, a traction force of the left road wheel 611 can be secured.

In accordance with the present embodiment, in the differential gear 607A having a limited slip differential function by the corn clutch 129, it is possible to use the different lubricating oil between the inner portion and the outer portion of the differential case 105 by means of the O-ring 119, the X-ring 131 and the plate 133.

Further, it is possible to transfer the differential gear 607A in which the lubricating oil is previously sealed as it is and there is no draw back that the oil left within the apparatus leaks out at a time of mounting, so that the mounting operation can be easily performed and the cost thereof can be reduced.

Further, since the plate 133 protrudes to the inner portion of the differential case, it is possible to effectively utilize an axial length of the side gear, so that it is possible to sufficiently secure a length of the connecting portion to the output shaft.

Further, since the X-rings 131 and 131 are arranged in the convex portion 105c of the differential case 105 inserted into the recessed portion of the back surface of each of the side gears 123, it is possible to structure the differential gear 607A to be compact in the axial direction.

Further, due to the recess portion 105f on the inner surface of the differential case 105, since it is possible to increase a sealing amount of the lubricating oil while maintaining the structure and the weight of the apparatus, the lubricating oil can be smoothly supplied to the corn clutch 129.

Fourth Embodiment

Figure 5:
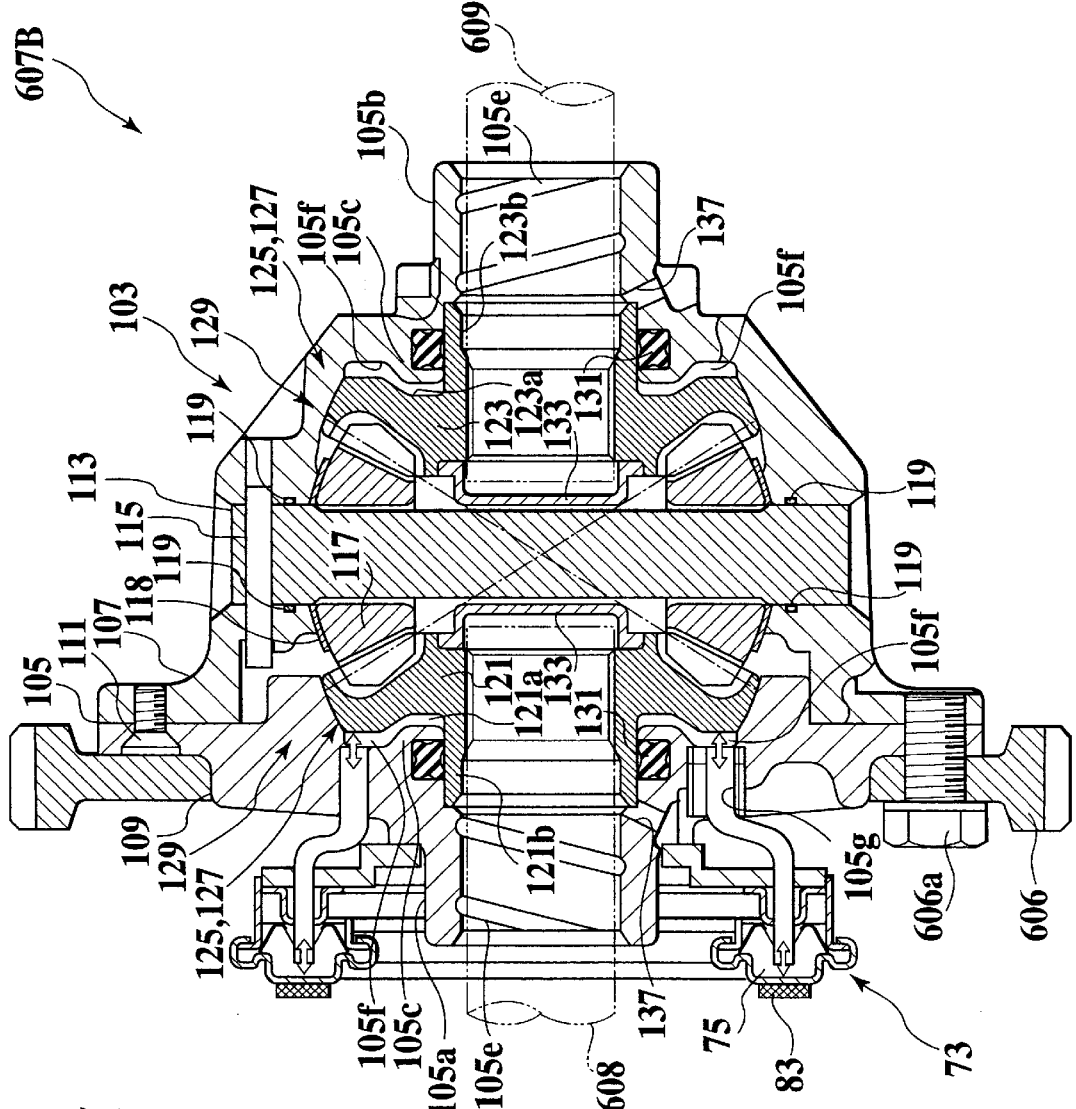
FIG. 5 is a cross-sectional view of a differential gear in accordance with a fourth embodiment.

FIG. 5 is a cross-sectional view of a differential gear in accordance with the present embodiment. The present embodiment is obtained by applying the accumulator (FIG. 3) in accordance with the second embodiment mentioned above to the differential gear. Accordingly, a description is mainly given of different points.

An opening portion 105g passes through the side wall of the case 105 and communicates with a recessed portion 105f of the differential case. The oil passage 77 is pressed to insert and adhered to the opening portion 105g. A diaphragm type accumulator 73 is fixed to the differential case 105 and communicates with the back surface side of the left side gear 121 through the oil passage 77. Further, a magnet 83 is mounted on an outer surface of the diaphragm chamber 75 of the accumulator 73.

Then, a charging port (not shown) for the lubricating oil is provided in the differential case 105, and a predetermined amount of lubricating oil is charged from the charging port. After charging, the charging port is sealed by a taper plug.

In accordance with the present embodiment, the same functions and benefits as those of the second embodiment in addition to the third embodiment mentioned above can be obtained by providing with the accumulator 73.

In this case, the accumulator in accordance with the present embodiment can be also applied to a bevel gear type or parallel shaft type differential gear provided with a multiple disc clutch.

Fifth Embodiment

Figure 6:
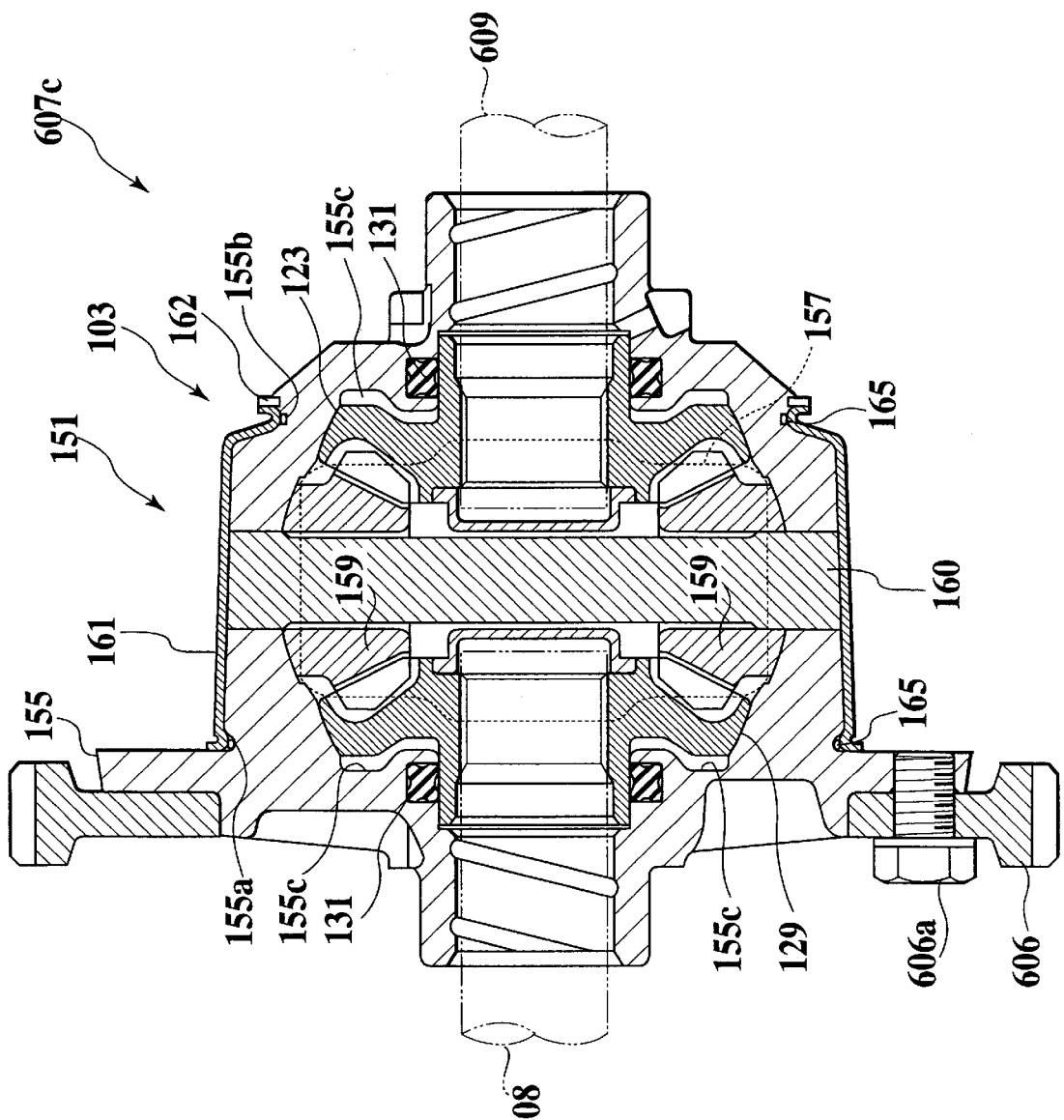
FIG. 6 is a cross-sectional view of a differential gear in accordance with a fifth embodiment.
Figure 7:
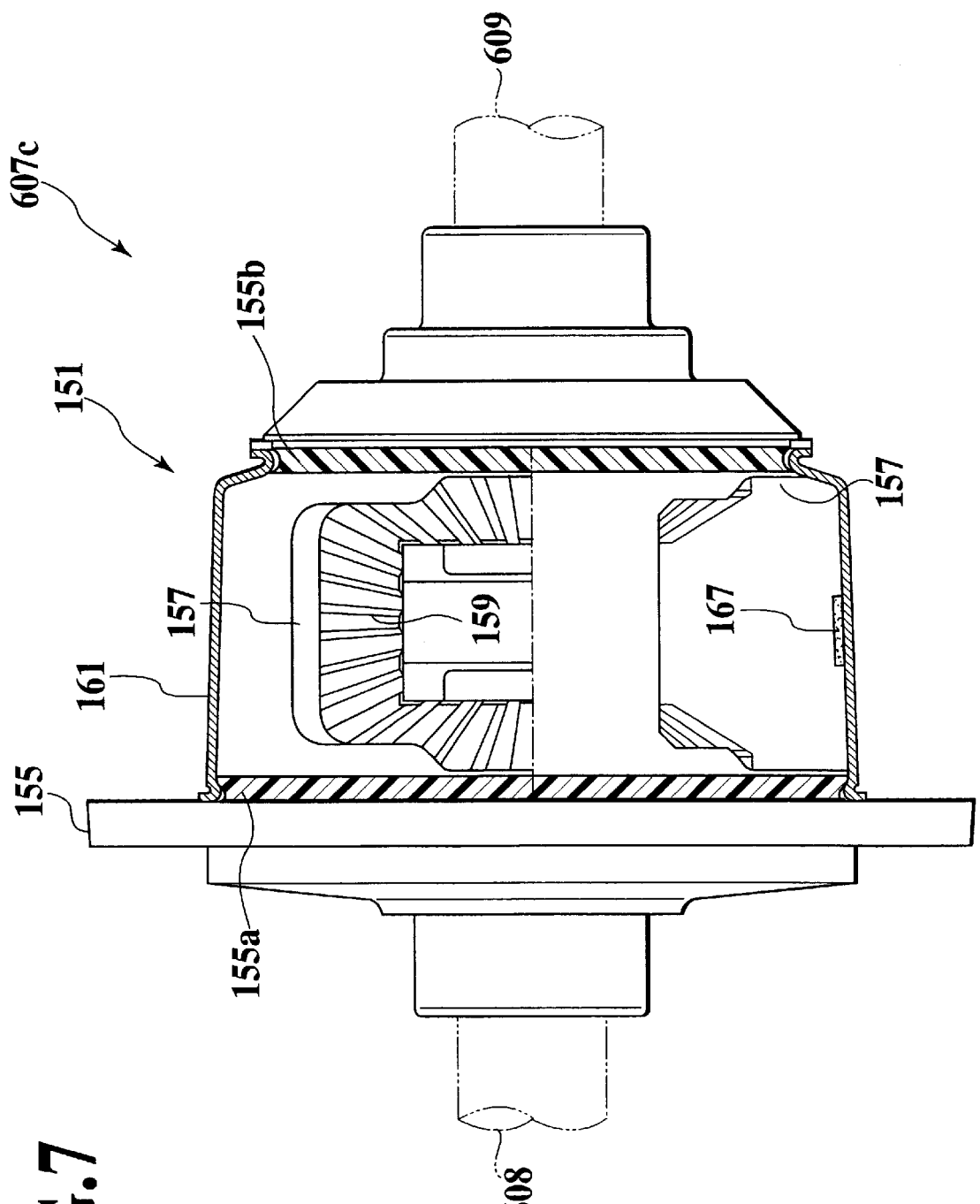
FIG. 7 is a partial side elevational view of the differential gear in accordance with the fifth embodiment, in which an upper half portion and a lower half portion are shifted at a phase of 90 degrees.

A description will be given of a fifth embodiment in accordance with the present invention with reference to FIGS. 6 and 7. FIG. 6 is a cross-sectional view of a differential gear in accordance with the present embodiment. FIG. 7 is a side elevational view showing only a cover for covering a cylinder portion of the differential case in a cross section.

The differential gear 607C has a similar structure to the third embodiment (FIG. 4).

A differential case 155 corresponding to an outer rotational member of the differential gear 607C is integrally formed. An annular recess portion 155c having the same structure as that of the third embodiment corresponding to the oil reservoir is formed on the inner surface of the differential case 155.

In a cylinder portion of the differential case 155, substantially rectangular two large opening 157 corresponding to the oil reservoir shown by a broken line in the drawing are provided in a middle portion of a pair of pinion gears 159 and 159 mentioned below in a peripheral direction. Further, the opening 157 is disposed outside the corn clutch 129 in a radial direction. The opening 157 is provided for assembling the constituting members for a bevel gear type differential gear mechanism 103 mentioned below, and is utilized as the oil reservoir. Further, abraded powders generated in the corn clutch 129 and the like are collected.

After assembling the differential gear mechanism 103 mentioned above, an annular cover 161 corresponding to a closing member or an annular member covers a whole of the cylinder portion of the differential case 155 including the opening 157 with using an annular seal member. Further, the cover 161 is prevented from being taken out by using a snap ring 162 and is mounted to be in contact with an outer surface of the cylinder portion.

That is, both end portions in an axial direction of the cover 161 are recessed so as to coincide with each of shapes of annular recess grooves 155a and 155b provided in the differential case 155. The end portions are sealed and mounted through a annular seal member 165 comprising a rubber member corresponding to the seal means, such as an O-ring. In this case, one opening may be provided and the seal member 165 may be a fluidized seal which is solidified with the passage of time.

Further, by using the cover 161, the end portion of the pinion shaft 160 is brought into contact with the cover 161 so as to prevent the pinion shaft 160 from being taken out. Accordingly, a take-out prevention member for the pinion shaft 160 can be omitted, and the apparatus can be made compact and light.

As shown in FIG. 7, a magnet 167 is positioned at a middle of the left and right O-rings 165 along a direction of the rotational axis and is fixed to an inner surface of the cover 161. Then, for example, iron abraded powders can be effectively collected.

With respect to the charging operation of the lubricating oil, before mounting the cover 161, the rotational shaft of the differential gear 151 is stood up. A distance to a fixed liquid surface within the differential case 155 is made correspond to the lubricating oil charging amount, and the cover 161 is fastened by a snap ring 162. Accordingly, it is possible to charge a predetermined amount of lubricating oil and an operability is improved.

Further, in place of the snap ring 162, it is possible to fix by a ring nut or a bolt at a plurality of portions in a circumferential direction, thereby forming a sealed state.

In accordance with the present embodiment, the opening 157 provided in the cylinder portion of the differential case 155 is utilized as the oil reservoir. Therefore, a lubricating oil amount can be sufficiently secured, and a good lubricating and cooling performance can be obtained by the lubricating oil, so that a durability of the differential gear 151 can be improved. Further, since the opening 157 is provided in the outer side in the radial direction with respect to the corn clutch 129, it is possible to collect the abraded powders generated in the corn clutch 129.

Further, only a distance corresponding to a thickness of the cover 161 protrudes to the outer diameter side, and it is possible to prevent the drive pinion gear or the like in the input side from being interfered with the peripheral members at a time of rotating.

In this case, the structure in which the opening of the cylinder portion in the differential case is formed as the oil reservoir as in the present embodiment can be applied to the differential gear having a multiple disc clutch and a parallel axis type differential gear.

Sixth Embodiment

Figure 8:
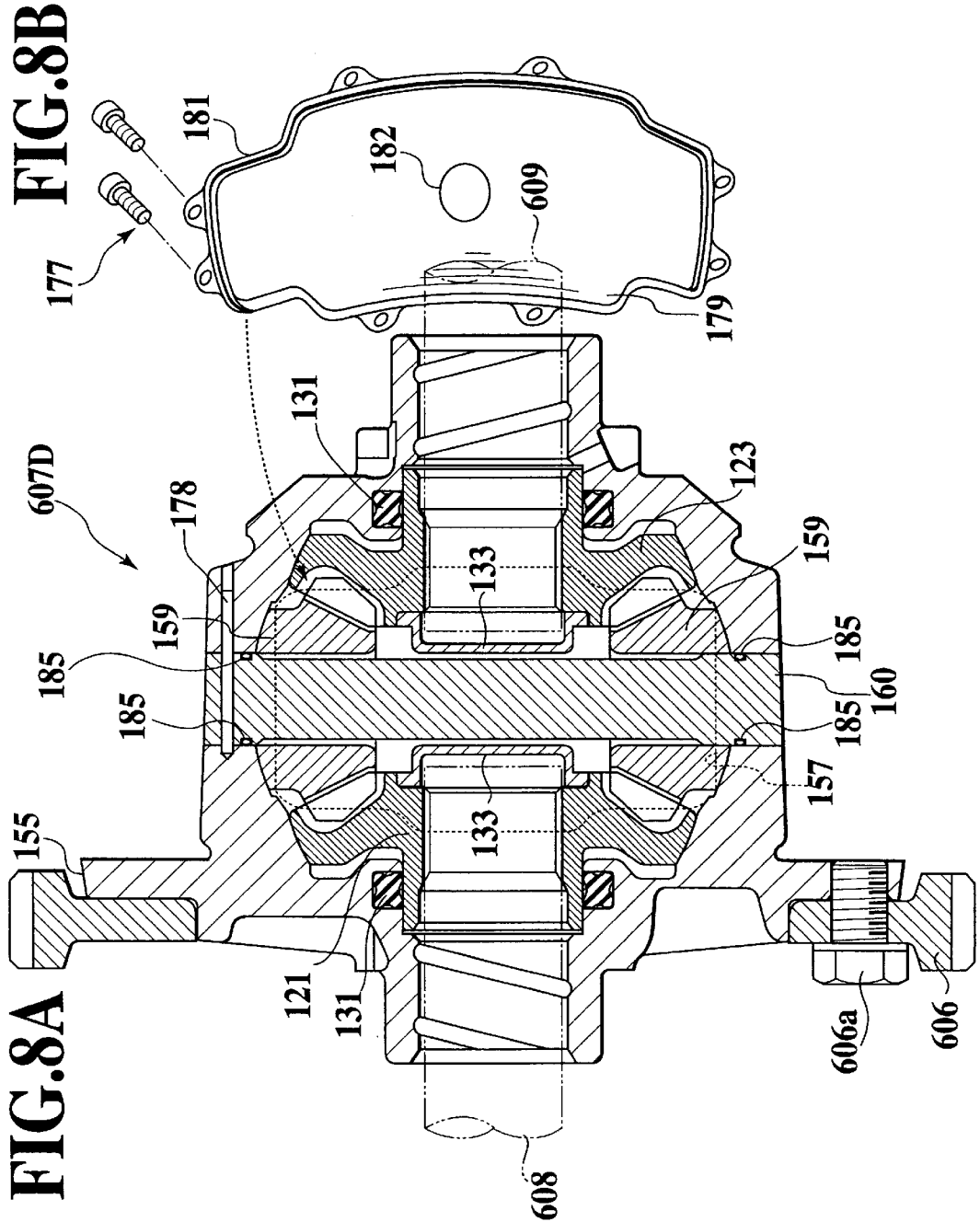
FIG. 8A is a cross-sectional view of a differential gear in accordance with a sixth embodiment.
FIG. 8B is a schematic view of a main portion of the differential gear in accordance with the sixth embodiment.

FIG. 8A is a cross-sectional:view of a differential gear in accordance with the present embodiment, and FIG. 8B is a schematic view of a main portion. Since the differential gear has a different sealing structure from the fifth embodiment mentioned above, a description will be given of the different points.

An opening 157 is provided in the cylinder portion of a differential case 155 of a differential gear 607D. The opening 157 is sealed by fastening a cover 179 and a seal member 181 by means of bolts 177. In this case, the cover 179 closes only the opening 157 and does not extend to an outer peripheral surface of the cylinder portion. The seal member 181 is structured, for example, by forming a rubber member so as to coincide with a shape of the opening 157.

A magnet 182 corresponding to a magnetic member is fixed to an inner surface of the cover 179.

Further, an insert portion of a pinion shaft 160 is sealed by seal rings 185 corresponding to a seal portion. A pin 178 prevents the pinion shaft 160 from being taken out.

A surface of the pinion gear 159 corresponding to the inner rotational member and an inner surface of the differential case 175 are brought into contact with each other. A friction-clutch operation is obtained by an engagement reaction force of the gear 159.

In accordance with the present embodiment, since the same functions and benefits as those of the fifth embodiment mentioned above can be obtained and the seal structure becomes more simple, a cost can be reduced.

Seventh Embodiment

Figure 9:
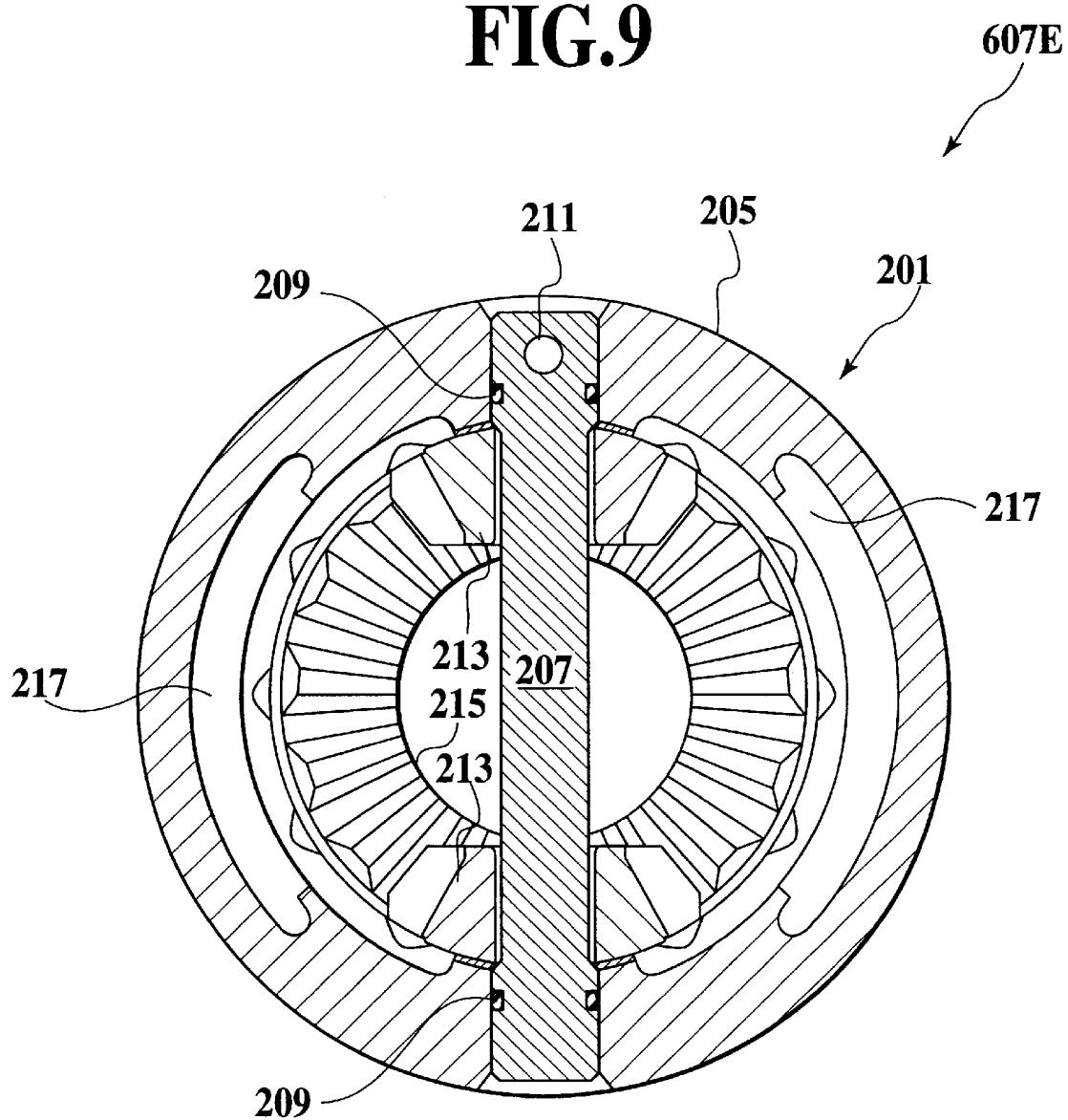
FIG. 9 is a cross-sectional view of a part of a differential gear in accordance with a seventh embodiment.

FIG. 9 is a cross-sectional view of a main portion of a differential gear in accordance with the present embodiment, and shows a cross section taken along a pinion shaft of a differential gear similar to the third embodiment (FIG. 4).

A pinion shaft 207 is inserted in a direction perpendicular to the rotational axis after passing through a cylinder portion of a differential case 205 of the differential gear 607E, and is sealed by seal rings 209 corresponding to the seal means. Then, it is prevented from being taken out by a pin 211. A pair of pinion gears 213 are rotatably supported on the pinion shaft 207. The pinion gears 213 are meshing with the oppositely arranged side gears 215 (only one side gear is illustrated).

A cylinder portion of the differential case 205 disposed in the direction perpendicular to the pinion shaft 207 extends to a predetermined range in a circumferential direction and an axial direction. Recessed portions 217 corresponding to a first oil reservoir are provided by cutting a thick portion of the inner peripheral wall. The recessed portion 217 serves the oil reservoir for the lubricating oil. The recessed portion 217 is positioned in a middle portion of a pair of pinion gears 213 along a circumferential direction or a rotational direction of the differential case 205.

In accordance with the present embodiment, since the recessed portion 217 of the differential case 205 serves as the oil reservoir, the same functions and benefits as those of the fifth embodiment mentioned above (FIGS. 6 and 7) can be obtained.

Eighth Embodiment

Figure 10:
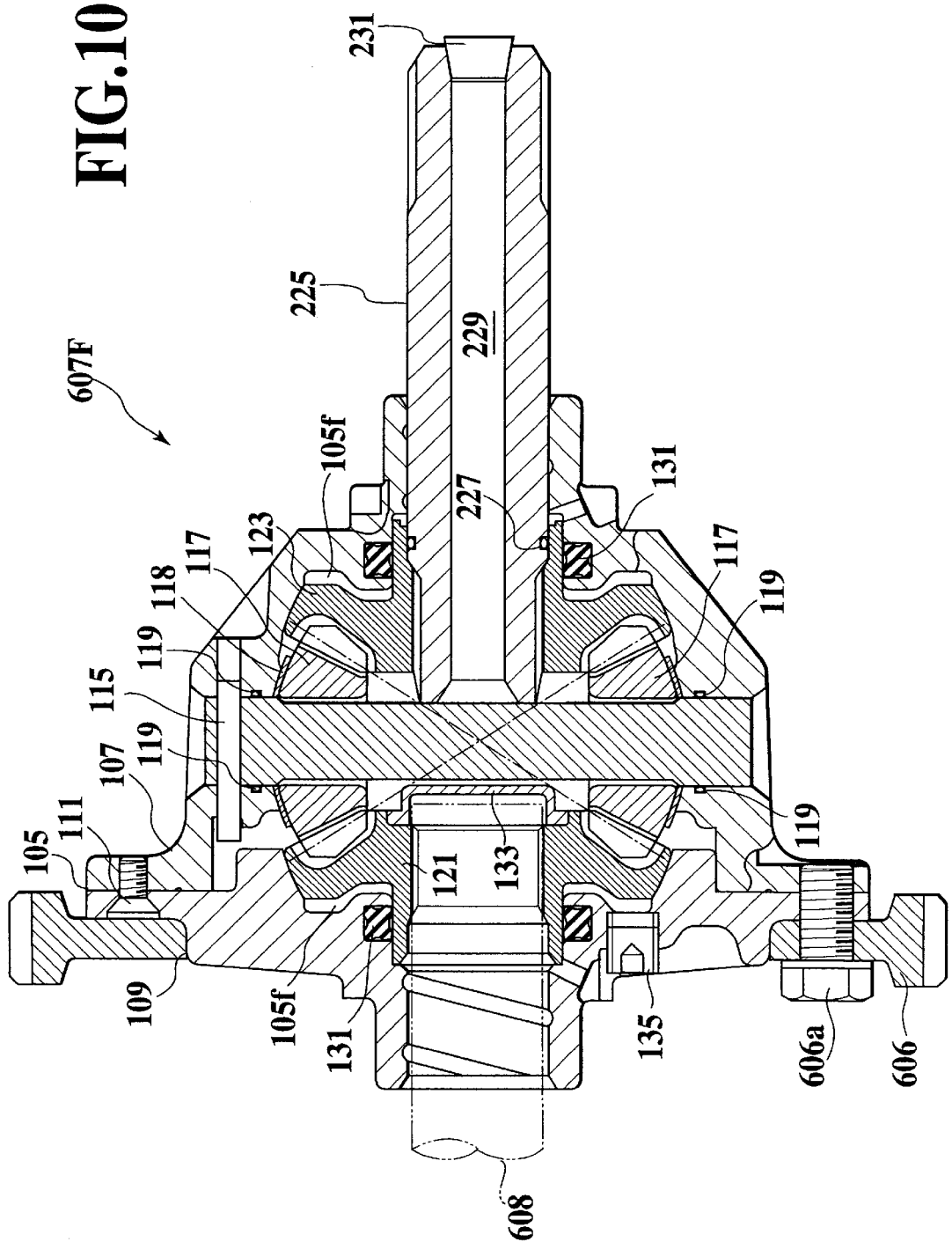
FIG. 10 is a cross-sectional view of a differential gear in accordance with an eighth embodiment.

FIG. 10 is a cross-sectional view of a differential gear in accordance with the present embodiment. The differential gear has a structure similar to that of the third embodiment mentioned above (FIG. 4).

As shown in FIG. 10, in this differential gear 607F, an intermediate shaft 225 corresponding to an inner rotational member is spline connected to an inner periphery of a right side gear 123. A portion between the side gear 123 and the intermediate shaft 225 is sealed by a seal ring 227 corresponding to a seal portion or seal means. The intermediate shaft 225 is formed to be hollow, and a right end of the hollow portion 229 corresponding to the cut portion is sealed by a taper plug 231 corresponding to a seal portion of seal means. Then, the hollow portion 229 serves as an oil reservoir for the lubricating oil.

In accordance with the present embodiment, since the hollow portion 229 of the intermediate shaft 225 serves as an oil reservoir, the same functions and benefits as those of the fifth embodiment mentioned above (FIGS. 6 and 7) can be obtained.

Further, it is possible to discharge the internal lubricating oil by taking out the taper plug 231.

Ninth Embodiment

Figure 11:
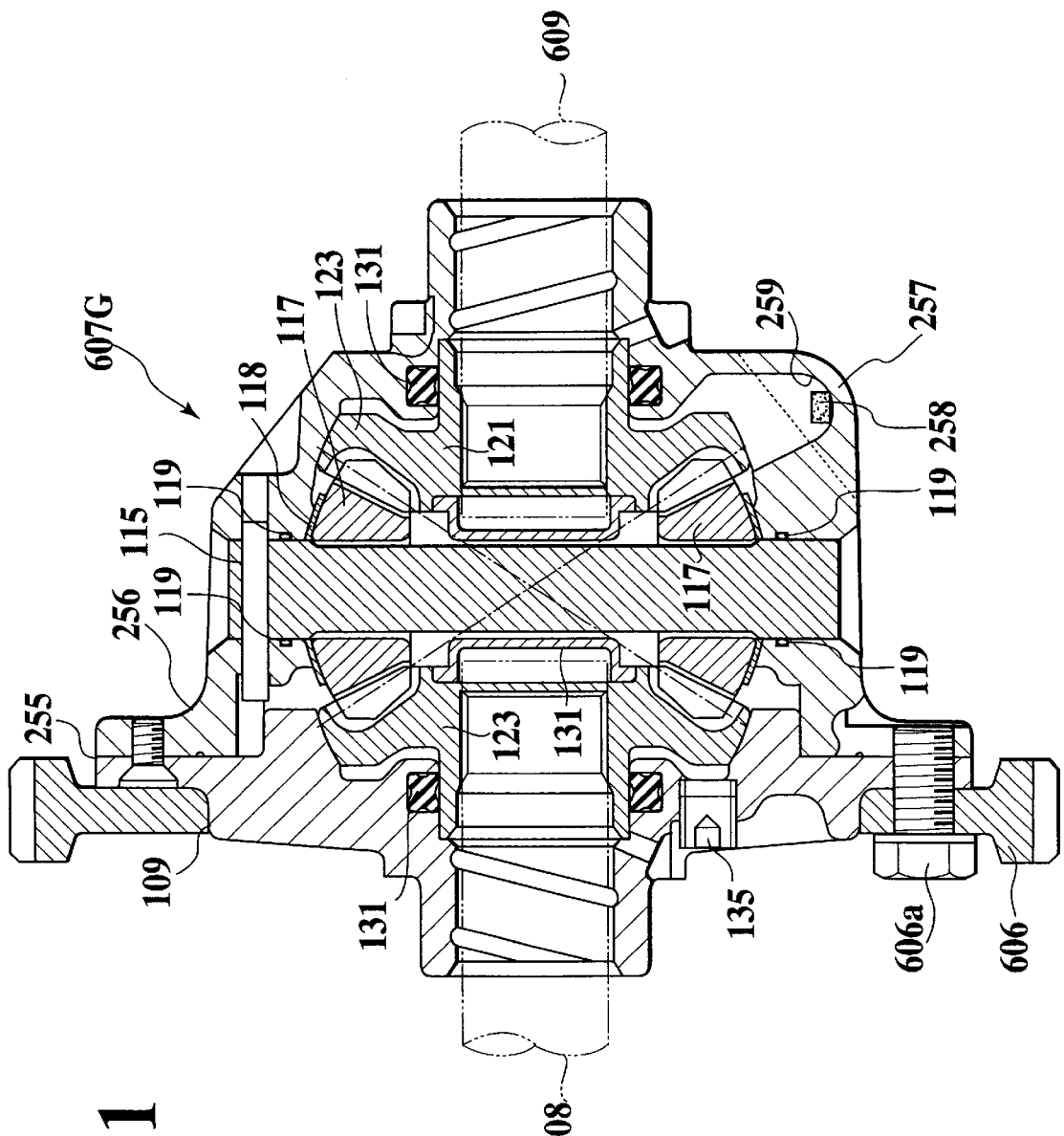
FIG. 11 is a cross-sectional view of a differential gear in accordance with a ninth embodiment.

FIG. 11 is a cross-sectional view of a differential gear in accordance with the present embodiment. The differential gear has a structure similar to that of the third embodiment mentioned above (FIG. 4).

In a differential case 255 of a differential gear 607G, a convex portion 257 corresponding to a protruding portion protruding in a radially outer direction is formed in a predetermined range in a circumferential direction of a main body 256. An oil reservoir 259 is provided in an inner space of the convex portion 257. A magnet 258 is fixed to a wall surface defining an oil reservoir 259.

In accordance with the present embodiment, since an inner side of the convex portion 257 of the differential case 255 serves as an oil reservoir, the same functions and benefits as those of the fifth embodiment mentioned above (FIGS. 6 and 7) can be obtained. Further, the abraded powders can be efficiently collected by the magnet 258.

Tenth Embodiment

Figure 12:
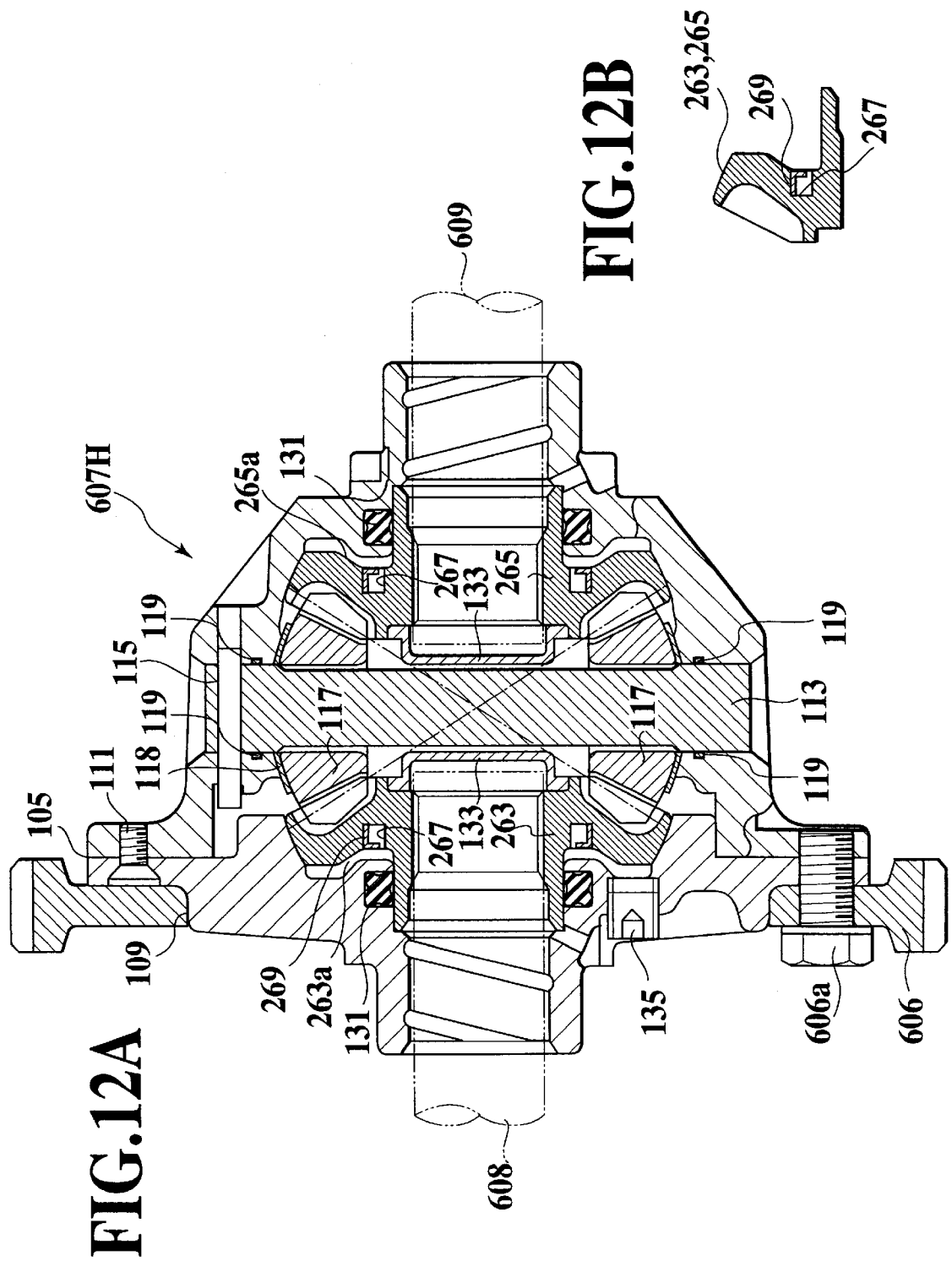
FIG. 12A is a cross-sectional view of a differential gear in accordance with a tenth embodiment.
FIG. 12B is an enlarged view of a main portion of FIG. 12A.

FIG. 12A is a cross-sectional,view of a differential gear in accordance with the present embodiment, and FIG. 12B is an enlarged view of a main portion. The differential gear has a structure similar to that of the third embodiment mentioned above (FIG. 4).

In this differential gear 607H, a ring-like groove 267 is provided in recess portions 263a and 265a of back surfaces of side gears 263 and 265 opposing to an inner wall of the differential case 105. Then, an L-shaped member 269 is pressed for inserting to the groove 267, and a ring-like gap is kept between the L-shaped member 268 and the groove 267.

In accordance with the present embodiment, since the groove 267 of the back surfaces of the side gears 263 and 265 serves as the oil reservoir, the same functions and benefits as those of the fifth embodiment mentioned above can be obtained.

Figure 13:
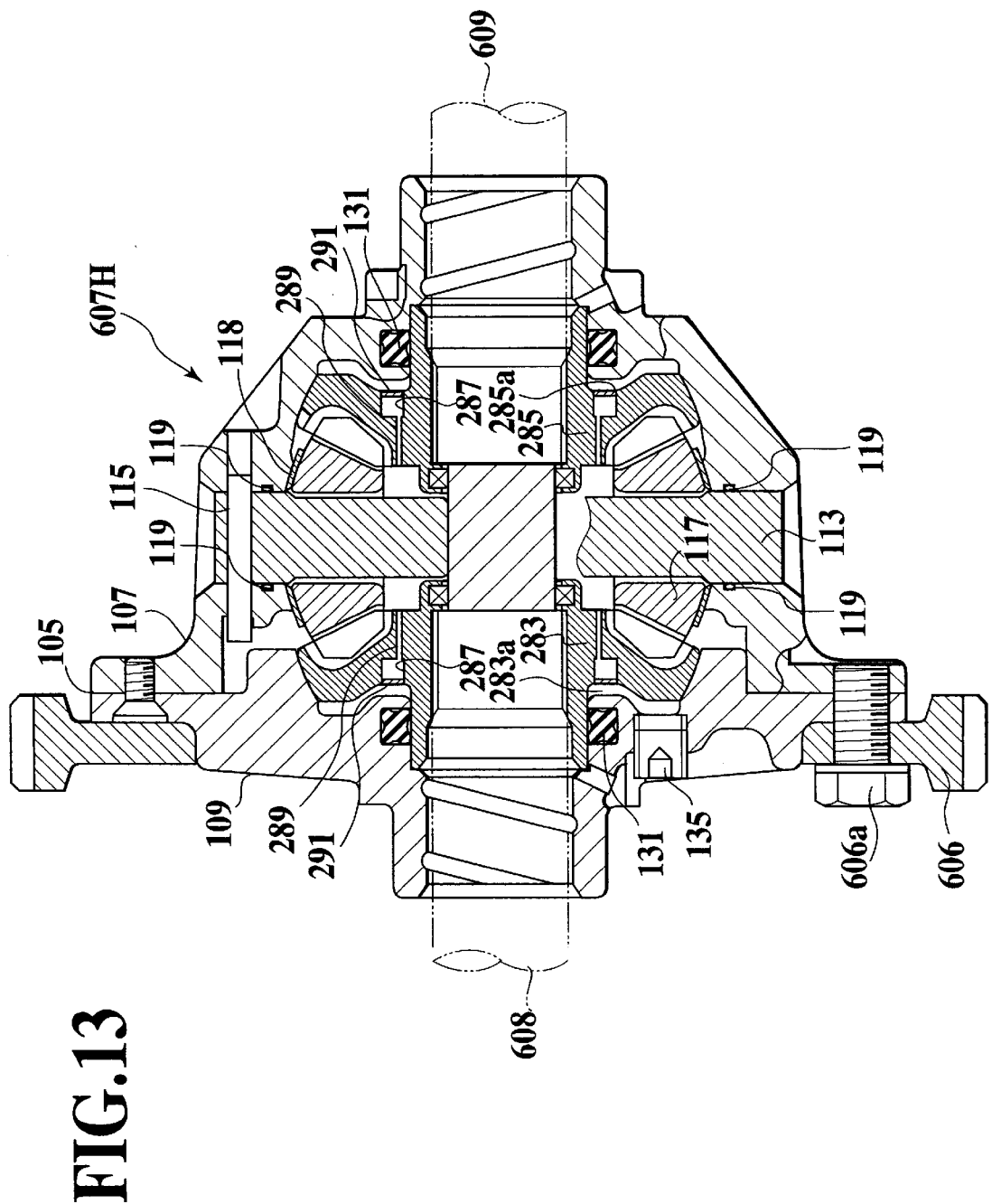
FIG. 13 is a cross-sectional view of a differential gear in accordance with an eleventh embodiment.

Further, since the metal abraded powders and the like contained in the lubricating oil entering into the groove 267 is hard to be discharged from the groove 267, a purifying effect for the lubricating oil can be obtained and it is possible to improve a durability of the differential gear Eleventh Embodiment FIG. 13 is a cross-sectional view of a differential gear in accordance with the present embodiment. The differential gear has a structure similar to that of the third embodiment mentioned above (FIG. 4).

In this differential gear 607H, each ring-like groove 287 is provided in recess portions 283a and 285a of the back surface of side gears 283 and 285, and each oil passage 289 for communicating the groove 287 with opposing surfaces of the side gears 283 and 285 is provided. Then, an outer opening portion of each groove 287 is closed by a plate member 291.

In the manner mentioned above, the oil passage 291 and the closed groove 287 form the oil reservoir and serve as a collecting place for the metal abraded powders contained in the lubricating oil.

In accordance with the structure mentioned above, only in view of a lubricating and cooling effect among the functions and benefits of the differential gear 281, in accordance with the present embodiment, the same functions and benefits as those of the tenth embodiment mentioned above (FIGS. 12A and 12B) can be obtained by the closed groove 287 and the oil passage 289 of the back surfaces of the side gears 283 and 285.

Twelfth Embodiment

Figure 14A:
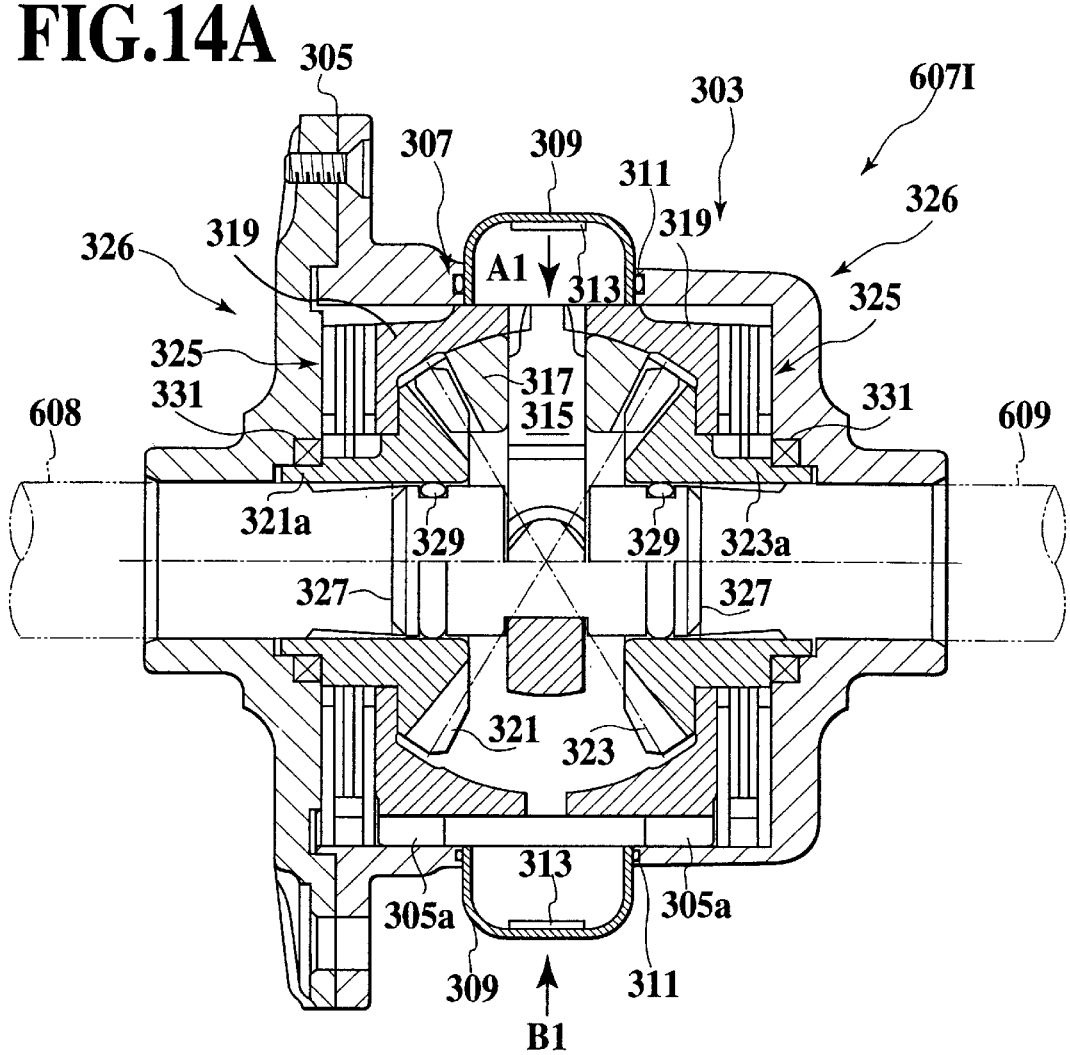
FIG. 14A is a cross-sectional view of a differential gear in accordance with a twelfth embodiment, in which an upper half portion is taken along a pinion shaft and a lower half portion is shifted at 90 degrees to the upper portion.

FIG. 14A is a cross-sectional view of a differential gear in accordance with the present embodiment. The differential gear is different from the third embodiment mentioned above (FIG. 4) in a point that a multiple disc clutch corresponding to a limited slip differential mechanism is provided.

Figure 14B:
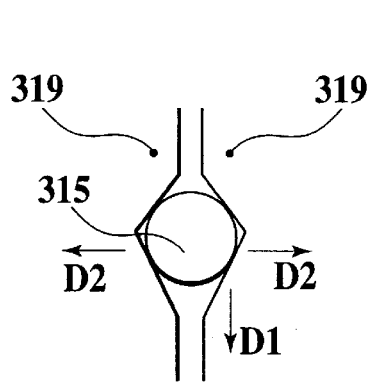
FIG. 14B is a schematic view as seen from an arrow A1 in FIG. 14A.
Figure 14C:
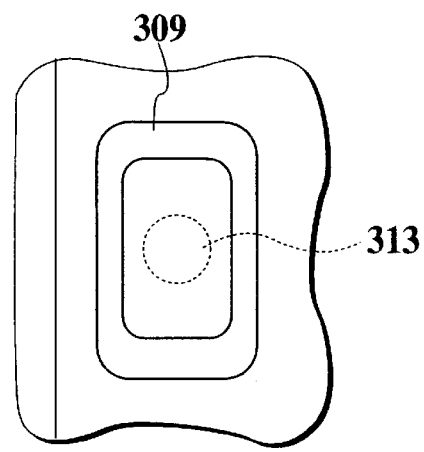
FIG. 14C is a schematic view as seen from an arrow B1 in FIG. 14A.

In this differential gear 607I, a cup-shaped member 309 corresponding a closing member is pressed for inserting to an opening 307 of a cylinder portion of a differential case 305, and is sealed by a seal ring 311 corresponding to seal means. A magnet 313 is mounted to an inner surface of the cup-shaped member 309, as also shown in FIG. 14C. Since the cup-shaped member 309 closes only the opening 307 and increases an amount of lubricating oil, the cup-shaped member 309 is protruded to expand in a radially outer direction. An inner portion of the cup-shaped member 309 is utilized as an oil reservoir.

A pinion shaft 315 is arranged perpendicular to a rotational axis of the differential case 305, and a pinion gear 317 is rotatably supported on the pinion shaft 315. Then, a pair of pressure rings 319 are arranged in such a manner as to oppose to each other with respect to the pinion shaft 315 and engage a groove 305a of the differential case 305, rotating integrally with the differential case 305. Then, each of the pressure rings 319 receives a thrust force in a rotational axis direction from side gears 321 and 323. Each of the opposing end portions of the rings 319 engages with an outer end portion cam of the pinion shaft 315 as shown in FIG. 14B, and the pinion shaft 315 presses the end portions in a rotational direction D1 and in an axial direction D2. The pressure rings 319 press multiple disc clutches 325 and 325 corresponding to a limited slip differential mechanism arranged between the side gears 321 and 323 and the differential case 305. In this manner, a differential gear mechanism 303 and a limited slip differential mechanism 326 are structured, whereby a differential motion between the side gears 321 and 323 is allowed and a differential motion is limited.

Further, as illustrated, thrust blocks 327 and 327 corresponding to a shaft-like member are fitted to a hollow hole portion of the side gears 321 and 323, and a seal ring 329 corresponding to seal means is arranged in each of the thrust blocks 327. On the contrary, a seal ring 331 corresponding to seal means is arranged in each of portions corresponding to outer ends of hollow shaft portions 321a and 323a of the side gears 321 and 323 in the differential case 305. In this manner, an inner portion of the differential case is sealed by the seal rings 329, 331 and 311.

Then, a lubricating oil is charged from a charging port (not shown) to the differential case 305 at a predetermined amount, and the differential case 305 is sealed by a taper plug.

In accordance with the present embodiment, the cup-shaped member 309 provided in a cylinder portion of the differential case 305 is utilized as an oil reservoir, and an amount of lubricating oil is sufficiently secured, so that the same functions and benefits as those of the ninth embodiment mentioned above (FIG. 11) can be obtained.

Further, since the metal abraded powders and the like contained in the lubricating oil are attracted to be fixed to the magnet 313 provided in the cup-shaped member 309, a durability of the differential gear 607I can be improved.

In this case, the present invention is not limited to the multiple disc type differential gear in accordance with the present embodiment, and can be also applied to a differential gear having a corn clutch and a parallel axis type differential gear.

Thirteenth Embodiment

Figure 15A:
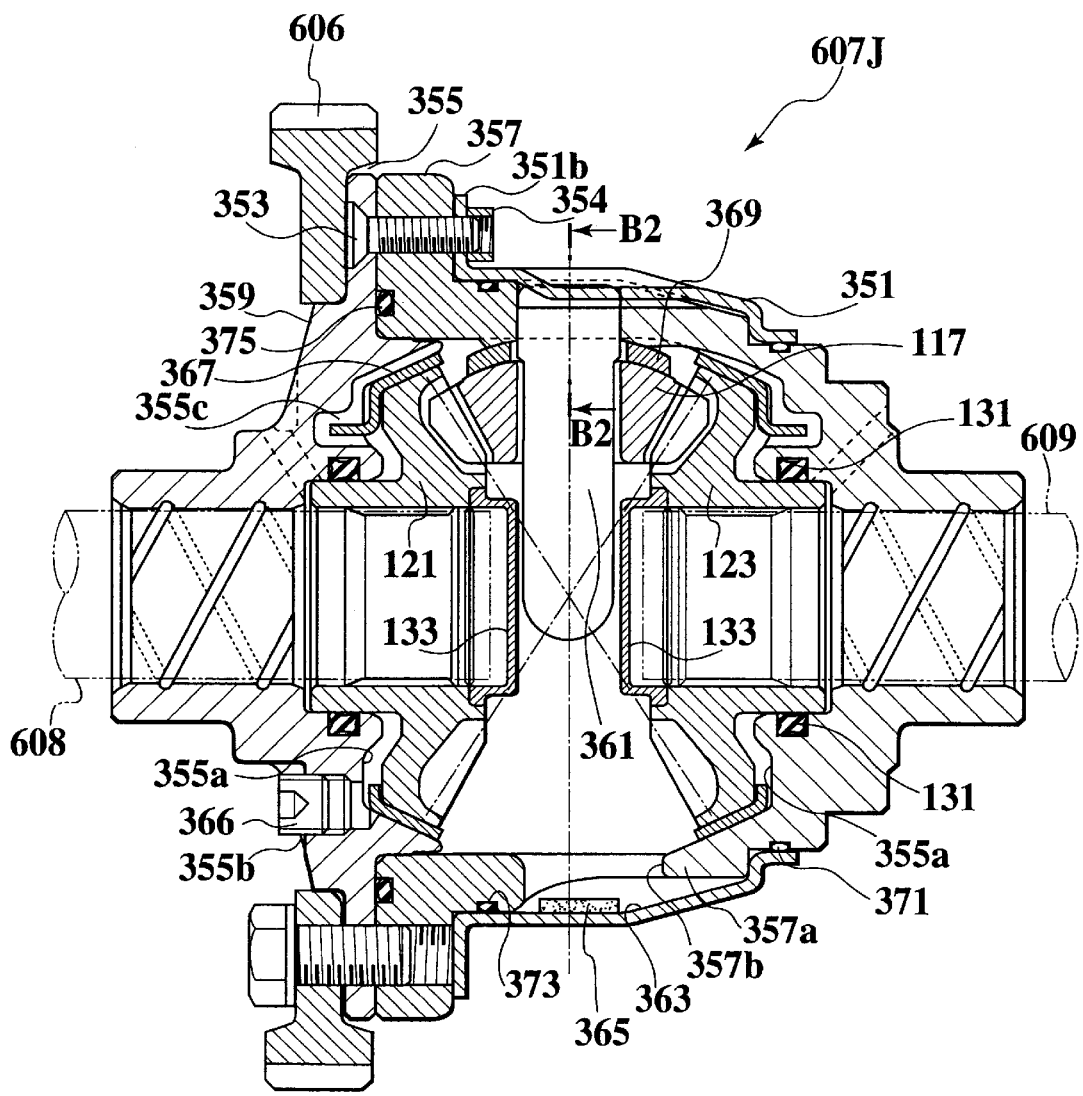
FIG. 15A is a cross-sectional view of a differential gear in accordance with a thirteenth embodiment, in which an upper half portion and a lower half portion has a different phase at 90 degrees.

FIG. 15A is a cross-sectional view of a corn clutch type differential gear. A differential gear 607J has substantially the same structure as that of the third embodiment.

Figure 15B:
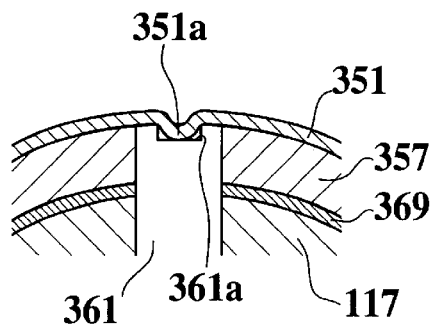
FIG. 15B is a cross-sectional view taken along line B2—B2 in FIG. 15A.

In a differential gear 607J, an,annular plate 351 made of a press sheet metal is mounted to an outer peripheral surface of a main body 357 of a case 355. The annular plate 351 has a linear convex portion 351a engaged with a groove-like recessed portion 361a on an end surface of a pinion shaft 361, as shown in FIG. 15B. The convex portion 351a serves as a take-out prevention function and a rotation-prevention function for the pinion shaft 361. An end of the annular plate 351 is a bent flange portion 351b. The flange portion 351b is pierced by a flat head screw 353 with a case main body 357 and a cover 359, and is fixed by a weld nut 354 so as to be positioned. The annular plate 351 and the differential case 355 are sealed by O-rings 371 and 373.

In the case main body 357, an opening 357b corresponding to a first oil reservoir passing through a side wall 357a is formed. A space 363 corresponding to a second oil reservoir is formed between the side wall 357a and the annular plate 351. Further, a magnet 365 corresponding to a magnetic member is fixed to an inner surface of the annular plate 351 in such a manner as to face to the opening 357b.

A recessed portion 355a corresponding to the first oil reservoir is provided on an inner surface of the differential case 355 in such a manner as to oppose to the side gears 121 and 123. An opening 355b passing through the case 355 is formed in such a manner as to communicate with the recess portion 355a. The opening 355b is closed by a screw 366 corresponding to a closing member.

A corn plate 367 corresponding to friction-clutch means is provided between the side gears 121 and 123 and the differential case 355. The corn plate is fitted to a notch portion 355c of the case 355 and is prevented from being rotated.

A spherical washer 369 is provided between the pinion gear 117 and the differential case 355 so as to reduce a friction resistance.

An O-ring 375 corresponding to the seal means is provided between the case main body 357 and the cover 359.

In accordance with the present embodiment, the annular plate 351 also fixes and positions the pinion shaft 361 in addition that the same advantages as those of the preceding embodiments can be obtained, and the structure of the apparatus can be made simple and the weight of the apparatus can be reduced.

The magnet 365 may be formed in an annular shape corresponding to an inner peripheral surface to be mounted. When mounting, the magnet 365 may be interposed between the plate 351 and the case main body 357 for fixing. According to these, the annular magnet 365 can collect abraded powders in circumference, thus obtaining a secure mounting state.

Fourteenth Embodiment

Figure 16:
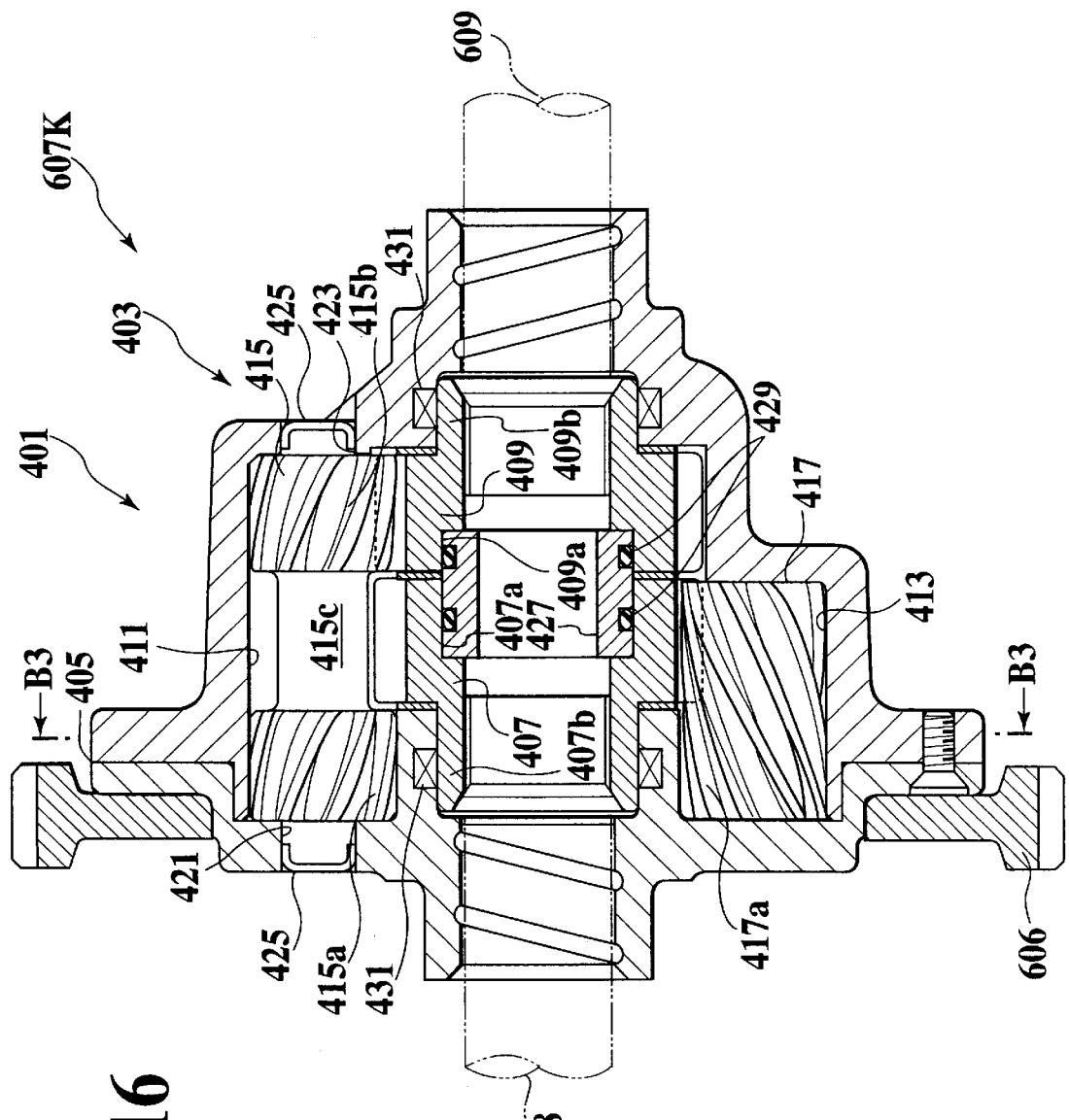
FIG. 16 is a cross-sectional view of a differential gear in accordance with a fourteenth embodiment.

FIG. 16 is a cross-sectional view of a differential gear in accordance with the present embodiment. The differential gear 607K is of a parallel axis type having a helical gear. A description will be mainly given of points different from the third embodiment (FIG. 4) which is of the bevel gear type.

A plural sets of pair of long and short cylindrical pinion gear receiving holes 411 and 413 provided in a periphery of annular side gears 407 and 409 are provided in a differential case 405 so as to be in parallel to a rotational axis. A long cylindrical pinion gear 415 is received in the receiving hole 411 and a short cylindrical pinion gear 417 is received in the receiving hole 413, the side gear portions 407 and 409 each having a gear portion in a helical shape. The long pinion gear 415 is constituted by a first gear portion 415a, a second gear portion 415b and a shaft portion 415c connecting between the first gear portion 415a and the second gear portion 415b, the gear portions 415a, 415b being formed in a helical shape. The second gear portion 415b of the long pinion gear 415 is meshing with a right side gear 409 and the short pinion gear 417 is meshing with a left side gear 407, respectively. The first gear portion 415a in the left end portion is engaged with a gear portion 417a formed in a helical shape.

Accordingly, the side gears 407 and 409 are connected to each other through the pinion gears 415 and 417. In the manner mentioned above, a differential gear mechanism 403 is structured.

When a rotational difference is generated between the side gears 407 and 409, a differential motion is limited by a sliding friction between the pinion gears 415 and 417 and inner walls defining the receiving holes 411 and 413 and a slide friction between each of the gears 407, 409, 415, and 417 and inner face of the differential case 405 due to a thrust force generated by an engagement of the helical gear. In the manner mentioned above, a limited slip differential mechanism is structured.

Through holes 421 and 423 are formed on the side wall of the differential case 405 corresponding to both end portions of the long receiving hole 411. Cup-like plugs 425 and 425 corresponding to a closing member are pressed for inserting thereto, so that the through holes 421 and 423 are sealed. In the manner mentioned above, the through holes 421 and 423 form an oil reservoir.

A thrust block 427 corresponding to a shaft member is fitted to be arranged over hollow holes 407a and 409a of the side gears 407 and 409, and both of the gears 407 and 409 are centered. Seal rings 429 and 429 corresponding to the seal means are arranged in the thrust block 427, and this portion is sealed. Further, seal rings 431 and 431 corresponding to the seal means are arranged in the differential case 405 at a position corresponding to the shaft portions 407*b* and 409*b* of the side gears 407 and 409, and this portion is sealed. In the manner mentioned above, the inner portion of the differential case 405 is sealed by the seal rings 429 and 431 and the plug 425.

Then, a lubricating oil is charged from a charging port (not shown) to the differential case 405 at a predetermined amount, and the differential case 405 is sealed by a taper plug.

Next, a description will be given of an operation of a differential gear 607K.

For example, in the case that the automobile is turned right, an engagement force between the left side gear 407 and the short pinion gear 417 becomes greater than that between the right side gear 409 and the long pinion gear 415. The pinion gear 415 and the pinion gear 417 rotate in an inverse direction with each other while sliding with the differential case 405. The pinion gear 417 rotates the side gear 407 in the same rotational direction as that of the differential case 405. On the contrary, the pinion gear 415 rotates the side gear 409 in a rotational direction opposite to that of the differential case 405. Accordingly, right turn can be smoothly performed.

On the contrary, when the left road wheel is caught by the bad road, the left road wheel :611 rotates at a low speed and the right road wheel 612 rotates at a high speed. At this time, the pinion gear 415 and 417 are pressed to a circumferential and side wall surfaces of the receiving holes 411 and 413 due to a reaction force generated by an engagement between the side gears 407 and 409, whereby the friction torque is generated. The friction torque increases a torque supplied to the left side gear 407 and reduces a torque of the right side gear 409. Accordingly, a traction force of the left road wheel 611 can be secured.

In accordance with the present embodiment, in the parallel axis type differential gear 607K, since the through holes 421 and 423 of the long receiving hole 411 form the oil reservoir, an amount of lubricating oil can be secured and the same functions and benefits as those of the ninth embodiment mentioned above (FIG. 11) can be obtained.

Fifteenth Embodiment

Figure 17:
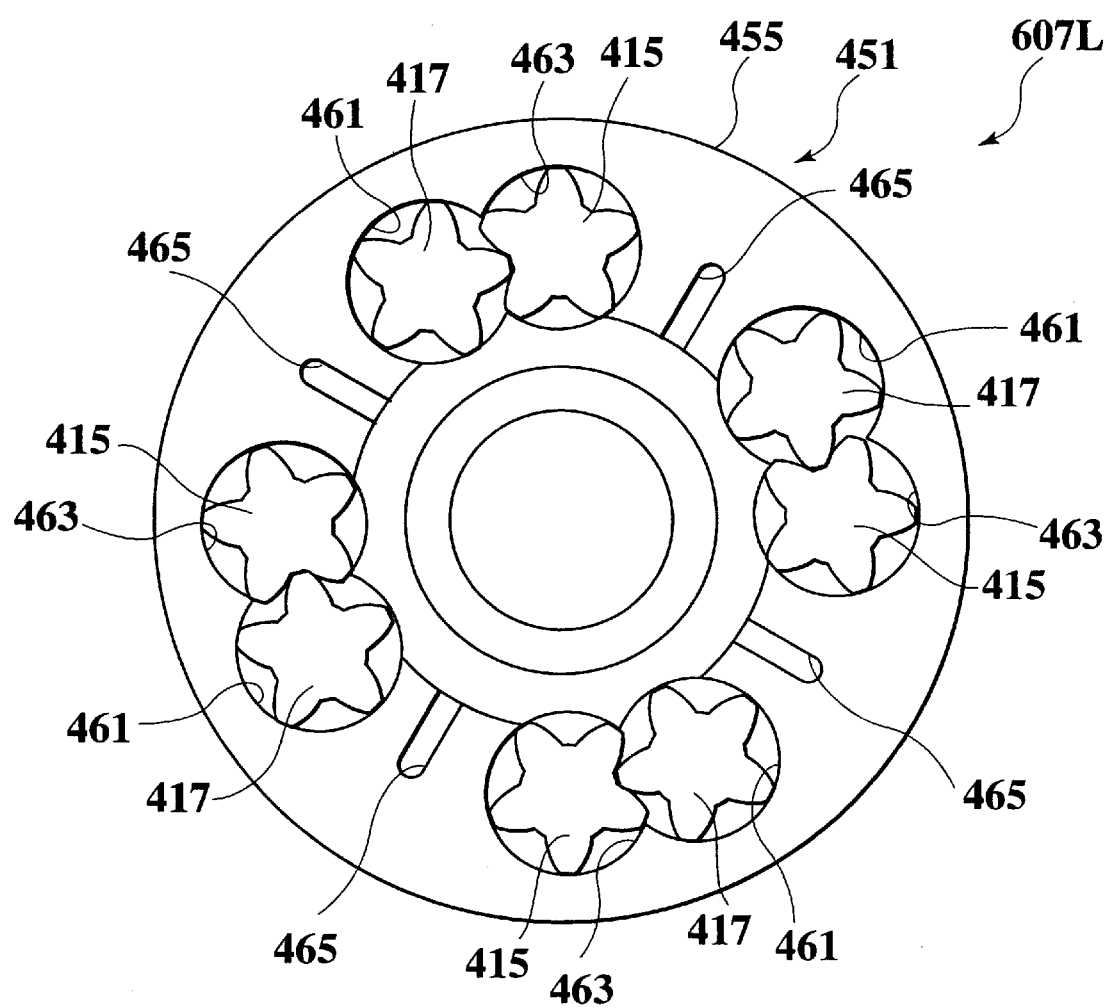
FIG. 17 is a cross-sectional view of a differential gear in accordance with a fifteenth embodiment taken along a diametrical direction.

FIG. 17 is a view cross sectioning a differential gear in accordance with the present embodiment in a radial direction with respect to a rotational axis. The differential gear is structured such that a structure of an oil reservoir is different from the fourteenth embodiment mentioned above (FIG. 16). The cross section of FIG. 17 is cut along a line corresponding to B3—B3 line of FIG. 16.

As shown in FIG. 17, in this differential gear 607L, a plurality of slots 465 are positioned at a predetermined range in an axial direction and radially extend in a radial direction. The slots 465 are formed between long and short receiving holes 461 and 463 of a differential case 455, and the slots 465 serve as an oil reservoir.

In accordance with the present embodiment, in the parallel axis type differential gear 451, since the slots 465 disposed between the receiving holes 461 and 463 serve as the oil reservoir, an amount of lubricating oil can be secured, and the same functions and,benefits as those of the ninth embodiment mentioned above (FIG. 11) can be obtained.

In this case, the features of the embodiments mentioned above are not limited to the embodiments to which the present invention is applied, and can be applied to all types of differential gear and coupling apparatus.

What is claimed is:

1. A power transmission apparatus employed for a drive train of a vehicle, comprising:

an outer rotary member having an inner side and an outer side;

an inner rotary member arranged inside the outer rotary member, the inner rotary member being rotatable relative to the outer rotary member;

a friction-clutch provided between the inner rotary member and the outer rotary member, the friction-clutch being configured to slidably interconnect between the inner rotary member and the outer rotary member; and a lubrication circuit for lubricating at least the friction-clutch, the lubrication circuit comprising:

a lubrication passage being sealed hydraulically in the outer rotary member;

a hydraulic reservoir communicating with the lubrication passage, the hydraulic reservoir comprising a first space provided through the outer rotary member; and a closing member closing the first space from outside of the outer rotary member.

2. A power transmission apparatus according to claim 1, wherein the closing member is disposed in the first space.

3. A power transmission apparatus according to claim 1, wherein the closing member winds annularly around the outer side of the outer rotary member.

4. A power transmission apparatus according to claim 3, wherein the closing member is contacted hydraulically tight with the outer side to the outer rotary member.

5. A power transmission apparatus according to claim 3, wherein the closing member is spaced apart from the outer side of the outer rotary member, and the first space includes a second space provided between the outer rotary member and the closing member and in communication with the first space.

6. A power transmission apparatus according to claim 5, further comprising:

a member to be moved for changing an internal volume of the second space portion between the closing member and of the outer rotary member.

7. A power transmission apparatus according to claim 1, further comprising:

a magnet fixed to the closing member.

8. A power transmission apparatus according to claim 3, further comprising:

a seal sealing annularly between the closing member and the outer side of the outer rotary member.

9. A power transmission apparatus according to claim 1, wherein the outer rotary member includes a side wall transverse relative to an axis thereof, and the hydraulic reservoir further comprises an annular third space recessed in the side wall from inside of the outer rotary member.

10. A power transmission apparatus according to claim 1, wherein the outer rotary member includes a side wall transverse relative to an axis thereof, and the first space is provided to the side wall and includes an annular fourth space arranged adjacent to the side wall and outside the outer rotary member in communication with the first space.

11. A power transmission apparatus according to claim 1, wherein the outer rotary member includes a thick portion thicker than other portions, and the hydraulic reservoir further comprises a fifth space recessed in the thick portion from inside of the outer rotary member.

12. A power transmission apparatus according to claim 11, wherein the thick portion has a protruding portion protruding outside the outer rotary member, and the fifth space is formed within the protruding portion.

13. A power transmission apparatus according to claim 11, further comprising:
   a plurality of power transmission gears supported along a circumferential direction in an outer rotary member side,
   wherein the fifth space is formed in the thick portion between the plurality of gears along the circumferential direction.

14. A power transmission apparatus according to claim 1, wherein the closing member positions and fixes a power transmission member arranged in the outer rotary member.

15. A power transmission apparatus according to claim 1, further comprising:
   a pinion shaft fixed in the outer rotary member; and
   a pinion gear supported rotatably around the pinion shaft,
   wherein the inner rotary member comprises a side gear meshed with the pinion gear to generate a differential motion,
   the outer rotary member comprises a case accommodating the side gear, and
   the friction-clutch comprises a corn clutch to slide between the side gear and the case to limit the differential motion.

16. A power transmission apparatus according to claim 1, wherein the hydraulic reservoir is positioned radially outside the friction-clutch.

17. A power transmission apparatus according to claim 1, wherein the hydraulic reservoir is positioned axially outside the friction-clutch, and radially inside the friction-clutch.

18. A power transmission apparatus according to claim 16, wherein the first space is a space formed in an inner portion of the side gear.

19. A power transmission apparatus according to claim 3, further comprising:
   an accumulator connected to the closing member.

20. A power transmission apparatus according to claim 1, further comprising:
   a seal sealing an axial end opening of the inner rotary member.

* * * * *